US012781771B2

(12) United States Patent
Vacca et al.

(10) Patent No.: US 12,781,771 B2
(45) Date of Patent: Nov. 3, 2026

(54) ELECTRO-HYDRAULIC ACTUATOR SYSTEMS AND METHODS OF OPERATING THE SAME

(71) Applicant: Purdue Research Foundation, West Lafayette, IN (US)

(72) Inventors: Andrea Vacca, West Lafayette, IN (US); Shaoyang Qu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 151 days.

(21) Appl. No.: 18/545,713

(22) Filed: Dec. 19, 2023

(65) Prior Publication Data

US 2024/0159253 A1 May 16, 2024

Related U.S. Application Data

(62) Division of application No. 17/667,680, filed on Feb. 9, 2022, now abandoned.

(Continued)

(51) Int. Cl.
*F15B 11/024* (2006.01)
*F15B 7/00* (2006.01)

(52) U.S. Cl.
CPC ............ *F15B 11/024* (2013.01); *F15B 7/006* (2013.01); *F15B 2211/20515* (2013.01); *F15B 2211/20538* (2013.01); *F15B 2211/20569* (2013.01); *F15B 2211/30525* (2013.01); *F15B 2211/3058* (2013.01); *F15B 2211/615* (2013.01); *F15B 2211/625* (2013.01); *F15B 2211/6651* (2013.01); *F15B 2211/6658* (2013.01); *F15B 2211/7053* (2013.01); *F15B 2211/75* (2013.01)

(58) Field of Classification Search
None
See application file for complete search history.

(56) References Cited

U.S. PATENT DOCUMENTS 10,309,429 B2 * 6/2019 Gomm .................... F15B 7/006

FOREIGN PATENT DOCUMENTS

WO WO-2018028944 A1 * 2/2018 ............. F15B 1/024

OTHER PUBLICATIONS

WO 2018028944 A1 machine translation to English from PE2Esearch (Year: 2025).*

(Continued)

*Primary Examiner* — Michael Quandt
(74) *Attorney, Agent, or Firm* — Hartman Global IP Law; Gary M. Hartman; Domenica N.S. Hartman

(57) ABSTRACT

An electro-hydraulic actuator system includes a fixed-displacement hydraulic pump and a variable speed electric motor configured in combination to constitute an individual electro-hydraulic unit that is coupled to an actuator, and a bypass valve in parallel to the actuator. The system is configured to enable the actuator to be operated at actuation speeds that are higher than a maximum actuation capability of the pump at the maximum flow capability thereof, and at actuation speeds that are lower than a minimum actuation capability of the pump at the minimum flow capability thereof. The actuation velocity of the actuator may be controlled by controlling the speed of the electro-hydraulic unit and a size of an opening of the bypass valve.

9 Claims, 22 Drawing Sheets

Related U.S. Application Data

(60) Provisional application No. 63/147,429, filed on Feb. 9, 2021.

(56) References Cited

OTHER PUBLICATIONS

Qu et al., "A high-efficient solution for electro-hydraulic actuators with energy regeneration capability", Energy, https://doi.org/10.1016/j.energy.2020.119291 (Year: 2020).*
Qu et al., "A closed circuit electro-hydraulic actuator with energy recuperation capability", 12th International Fluid Power Conference (12. IFK). Dresden, Oct. 12-14, 2020, https://nbn-resolving.org/urn:nbn:de:bsz:14-qucosa2-710772 (Year: 2020).*
Vacca, Andrea. "Individual Electro-Hydraulic Drives for Off-Road Vehicles". Maha Fluid Power Research Center Purdue University. Jun. 13, 2019. (Year: 2019).*

* cited by examiner

TABLE I. PARAMETERS FOR SIZING THE SYSTEM

| **Sizing Parameters** | | **Value[unit]** |
|---|---|---|
| *Cylinder size* | Length of stroke $L$ | 0.8865[m] |
| | Diameter of piston $D$ | 69.9[mm] |
| | Diameter of rod $d$ | 44.2[mm] |
| | Area ratio $\lambda$ | 1.68[-] |
| *Actuation requirements* | Extension time $t_{min,ex}$ | 4.43[s] |
| | Extension velocity $\dot{x}_{max,ex}$ | 0.200[m/s] |
| | Retraction time $t_{min,re}$ | 2.63[s] |
| | Retraction velocity $\dot{x}_{max,re}$ | 0.337[m/s] |
| *Loading conditions* | Loading pressure $p_{max}$ | 130[bar] |
| | Loading force $F_{max}$ | 50000[N] |

FIG. 18

TABLE II. MAIN PARAMETERS OF THE COMPONENTS

| **Parameters of components** | | **Value[unit]** |
|---|---|---|
| Pump displacement $V_D$ | 2-quadrant unit | 16.5[cm3/rec] |
| | 4-quadrant unit | 14.5[cm3/rec] |
| Pump maximum speed $n_{max}$ | 2-quadrant unit | 3000[rpm] |
| | 4-quadrant unit | |
| Pump minimum speed $n_{min}$ | 2-quadrant unit | 500[rpm] |
| | 4-quadrant unit | 600[rpm] |
| Crack pressure of CV $p_{crack}$ | | 0.35[bar] |
| Tank pressure $p_t$ | | atmospheric pressure |
| Pre-charge pressure of the accumulator $p_0$ | | 4.5[bar] |
| Volume of accumulator $V_0$ | | 4 [L] |
| Relief pressure $p_r$ | | 210[bar] |

FIG. 19

TABLE III. REGULATION OF WORKING MODES

| $i$ | $dp$ | Modes |
|---|---|---|
| $i > 0,\ n_{min}/n_{max} < i < 1$ | $dp > 0$ | $1a$ |
| $i > 0,\ i < n_{min}/n_{max}$ | $dp > 0$ | $1b$ |
| $i > 0,\ \lambda \cdot n_{min}/n_{max} < i < \lambda$ | $dp < 0$ | $2a$ |
| $i > 0,\ i < \lambda \cdot n_{min}/n_{max}$ | $dp < 0$ | $2b$ |
| $i < 0,\ n_{min}/n_{max} < \lvert i \rvert < 1$ | $dp < 0$ | $3a$ |
| $i < 0,\ \lvert i \rvert < n_{min}/n_{max}$ | $dp < 0$ | $3b$ |
| $i < 0,\ n_{min}/(\lambda \cdot n_{max}) < \lvert i \rvert < 1/\lambda$ | $dp > 0$ | $4a$ |
| $i < 0,\ \lvert i \rvert < n_{min}/(\lambda \cdot n_{max})$ | $dp > 0$ | $4b$ |
| $i < 0, 1/\lambda < \lvert i \rvert$ | $dp > 0$ | $4c$ |

FIG. 20

TABLE IV. HARDWARE LIST OF THE EXPERIMENTAL SETUP

| Hardware | Product Number |
|---|---|
| Gear pump/motor 2quadrant | Rexroth AZMF - 12 -016 URR 12 ML |
| Gear pump/motor 4quadrant | Casappa PLP20-14 L 0 - 31 S1 - L OD |
| HDP servomotor | ABB VM47A00202001B00 |
| Inverter | ABB ACS800-U11 |
| 4/3 Directional valve | Rexroth 4WE10G5X/EG24N9K4/M |
| On/off valves | Rexroth OD150536A000000 |
| Prop. 2/2 direction valve | Rexroth KKDSR1NB/HCG24N0K4V |
| Check valves | Rexroth 0431200056O3000 |
| Relief valves | Rexroth DBDH6G40012 |
| Cylinders | CNH Case TV380 Boom Actuators |
| Accumulator | Rexroth HAB4-350-6X/0G07G-2N111-CE |
| Filter | Rexroth 50LEN0063-H6XLA00-V5,0-M-R3 |
| Pressure sensor | Rexroth R917A10105 |
| Position sensor | ASM WS42 |

FIG. 21

TABLE V. MODELING OF COMPONENTS IN SIMULATION

| | Symbol | | Description |
|---|---|---|---|
| HP | 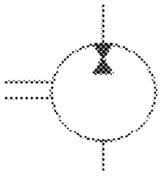<br>2-quadrant unit | 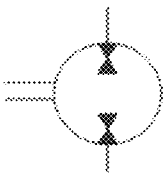<br>4-quadrant unit | Pumping mode<br>$Q = \eta_{vol} n V_D$<br>$T = \Delta p V_D = \eta_{hm} P/\omega$<br>Motoring mode<br>$Q = n V_D/\eta_{vol}$<br>$T = P/\omega = \eta_{hm} \Delta p V_D$ |
| CYL | 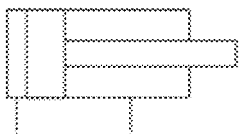 | | $p_1 A - p_2 a = F$<br>$\frac{\partial p}{\partial t} = \frac{K}{V}\left(\sum Q - \frac{\partial V}{\partial t}\right)$ |
| ACC | 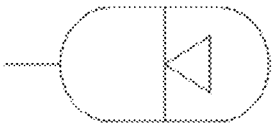 | | $pV^{\gamma} = p_0 V_0^{\gamma} = C$<br>$\gamma = 1.4$ (adiabatic)<br>$V_0 > V_1 - V_2 = V_{rod}$ |
| BPV | 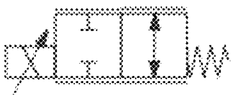 | | $Q = c_f \Omega_O \sqrt{\frac{2\Delta p}{\rho}}$<br>$= c_f \Omega_O \sqrt{\frac{2\lvert p_1 - p_2 \rvert}{\rho}}\,\alpha$<br>$\alpha = sign(p_1 - p_2)$ |
| 4/3 DV |  | | |
| CV |  | | $X_v = \frac{p_2 - p_1 - p_{crack}}{p_{sat} - p_{crack}}$ |

FIG. 22

ELECTRO-HYDRAULIC ACTUATOR SYSTEMS AND METHODS OF OPERATING THE SAME

CROSS REFERENCE TO RELATED APPLICATIONS

This is a division patent application of co-pending U.S. patent application Ser. No. 17/667,680 filed Feb. 9, 2022, which claims the benefit of U.S. Provisional Application No. 63/147,429 filed Feb. 9, 2021. The contents of these prior patent documents are incorporated herein by reference.

STATEMENT REGARDING FEDERALLY SPONSORED RESEARCH

This invention was made with government support under contact number DE-EE0008334 awarded by the Department of Energy. The government has certain rights in the invention.

BACKGROUND OF THE INVENTION

The present invention generally relates to electro-hydraulic actuator systems. The invention particularly relates to electro-hydraulic actuator systems that include a fixed-displacement hydraulic pump and a bypass valve configured to allow an actuator to operate (actuate) at speeds lower and higher than what is otherwise possible with the minimum and maximum flow capabilities, respectively, of the hydraulic pump.

With the advantages of high-power density, low cost, and robust operation, hydraulic control technologies have been employed in multiple industries for decades. However, hydraulic drives often have very low energy efficiencies. For example, mobile hydraulic applications in the US market have been reported to have an average efficiency of about 21%. A significant source of these inefficiencies is throttling losses associated with the regulation of the actuator velocity, especially for mobile applications such as construction and agriculture machines (e.g., excavators, wheel loaders, cranes, agricultural tractors, etc.) which conventionally use centralized hydraulic systems. In these systems, a limited number of hydraulic pumps are utilized to power multiple actuators with systems based on hydraulic control valves that introduce throttling losses. Moreover, during assistive phases of the duty cycles, a centralized system inevitably dissipates the energy entering the system from the actuator. Therefore, there is an increasing interest in replacing conventional centralized hydraulic systems with decentralized hydraulic systems for improved energy efficiency.

Due to emissions regulations and environmental concerns, decentralized/individualized hydraulic systems that include an electro-hydraulic actuator system having a dedicated electric motor for each actuator are becoming more desirable. In particular, hybrid systems that include electric batteries connected to the electric motor or through hydraulic accumulators may have the potential for high efficiency gains. Specifically, these hybrid systems may be capable of recovering energy with the batteries and hydraulic accumulators during assistive working modes. However, apart from a few aerospace examples, electro-hydraulic actuator systems have failed to penetrate commercial markets, especially construction and off-road vehicle markets which contribute significantly to industrial energy consumption.

One factor that has limited the adoption of electro-hydraulic actuator systems is a tradeoff between cost and flexibility. In particular, an electro-hydraulic unit comprising one or more electro-hydraulic actuator systems tends to be both the most expensive component as well as a significant aspect of overall efficiency. Two common types of electro-hydraulic units are a variable-speed electric motor combined with a fixed displacement pump (VM-FP), and a constant-speed electric motor combined with a variable-displacement pump (CM-VP). CM-VP electro-hydraulic units (optionally with hydraulic transmission control) have shown good controllability. However, VM-FP electro-hydraulic units are often preferred due to their energy efficiency and cost consideration.

One of the technical challenges impeding widespread adoption of VM-FP-based electro-hydraulic actuator systems is a pump speed limitation constraint, which hinders the functionality of electro-hydraulic actuator systems for low-speed actuation. This limitation is imposed by high volumetric and torque losses at low speed operation of the hydraulic pumps, as well as increased wear of the journal bearings.

In addition, sizing of electro-hydraulic actuator systems for hydraulic systems is commonly based on a maximum flow required for each actuator. This can result in a significant oversizing of the hydraulic system when compared to conventional centralized solutions that use a single hydraulic pump to supply multiple actuators. Such oversizing can result in additional expense.

In view of the above, it can be appreciated that there are certain problems, shortcomings or disadvantages associated with electro-hydraulic actuator systems, and that it would be desirable if VM-FP-based electro-hydraulic actuator systems were available that were capable of addressing the pump speed limitation constraint, and optionally, the common oversizing issue.

BRIEF DESCRIPTION OF THE INVENTION

The present invention provides electro-hydraulic actuator systems with a variable-speed electric motor and a fixed displacement hydraulic pump configuration and methods of operating the same.

According to one aspect of the invention, an electro-hydraulic actuator system is provided that includes an actuator having extension and retraction modes of operation, a bypass valve in parallel to the actuator, and a fixed-displacement hydraulic pump and a variable speed electric motor configured in combination to constitute an individual electro-hydraulic unit that is coupled to the actuator for actuation thereof between the extension and retraction modes. The fixed-displacement hydraulic pump has a maximum flow capability and a minimum flow capability, and the system is operable to actuate the actuator at actuation speeds that are higher than a maximum actuation capability of the fixed-displacement hydraulic pump at the maximum flow capability thereof and at actuation speeds that are lower than a minimum actuation capability of the fixed-displacement hydraulic pump at the minimum flow capability thereof.

According to another aspect of the invention, a method is provided that includes providing an electro-hydraulic actuator system having a fixed-displacement hydraulic pump and a variable speed electric motor configured in combination to constitute an individual electro-hydraulic unit that is coupled to an actuator for actuation thereof, and a bypass valve in parallel to the actuator, and controlling the actuation velocity of the actuator by controlling the speed of the electro-hydraulic unit and a size of an opening of the bypass valve.

Technical effects of electro-hydraulic actuator systems and methods as described above preferably include the ability to enable an actuator to achieve relatively low actuation speeds without being limited by the minimum flow capability of a hydraulic pump, to enable the actuator to achieve relatively high actuation speeds without relying on the electro-hydraulic unit, and to allow the actuator to achieve relatively high actuation speeds without being limited by the maximum flow capability of the hydraulic pump.

Other aspects and advantages of this invention will be appreciated from the following detailed description.

BRIEF DESCRIPTION OF THE DRAWINGS

FIG. 18 contains Table I that includes certain parameters used for sizing and selecting the components of the electro-hydraulic actuator system of FIGS. 1 and 2.

FIG. 19 contains Table II that includes certain parameters used in the components of the electro-hydraulic actuator systems of FIGS. 1 and 2.

FIG. 20 contains Table III that includes regulation rules for controlling working modes of the electro-hydraulic actuator systems of FIGS. 1 and 2.

FIG. 21 contains Table IV that includes a list of hardware components used to manufacture the test system of FIG. 6.

FIG. 22 contains Table V that includes equations associated with individual components used in the simulation model for simulating performance of the electro-hydraulic actuator systems of FIGS. 1 and 2.

DETAILED DESCRIPTION OF THE INVENTION

Disclosed herein are hydraulic systems and particularly electro-hydraulic actuator (EHA) systems with energy regeneration capabilities. Such EHA systems comprise an actuator (e.g., a differential, double-acting cylinder) and a hydraulic pump, and are configured to operate in a manner that is capable of operating (extending and retracting) the actuator at actuation speeds that are higher than a maximum actuation capability of the pump at its maximum flow capability (i.e., maximum operating speed (velocity) of the pump) and actuation speeds that are lower than a minimum actuation capability of the pump at its minimum flow capability (i.e., minimum operating speed (velocity) of the pump). As such, the term "actuation capability" (and its variants) refers to the actuation speeds of the actuator that would be achieved if the actuator was being actuated solely by the pumping (flow) capacity of the pump.

The EHA systems utilize a control strategy based on a combination of throttle-less control as well as metering control, accomplished in part with the use of a bypass valve. As such, the EHA systems are capable of addressing the previous challenge of pump speed limitation constraint which has commonly hindered the functionality of EHA systems for low-speed actuation in conventional hydraulic systems. The EHA systems comprise an electro-hydraulic unit (EHU) that includes the hydraulic pump and an electric motor. The EHU may have an open-circuit architecture or a closed-circuit architecture. The EHA systems may promote cost efficiencies by utilizing EHUs that are sized below the maximum flow of the actuators that they control. For example, the EHU may be sized to satisfy a flow rate at operating conditions where high efficiency is desired. In this way, these operating conditions can be achieved in complete throttle-less regulation.

Figure 1:
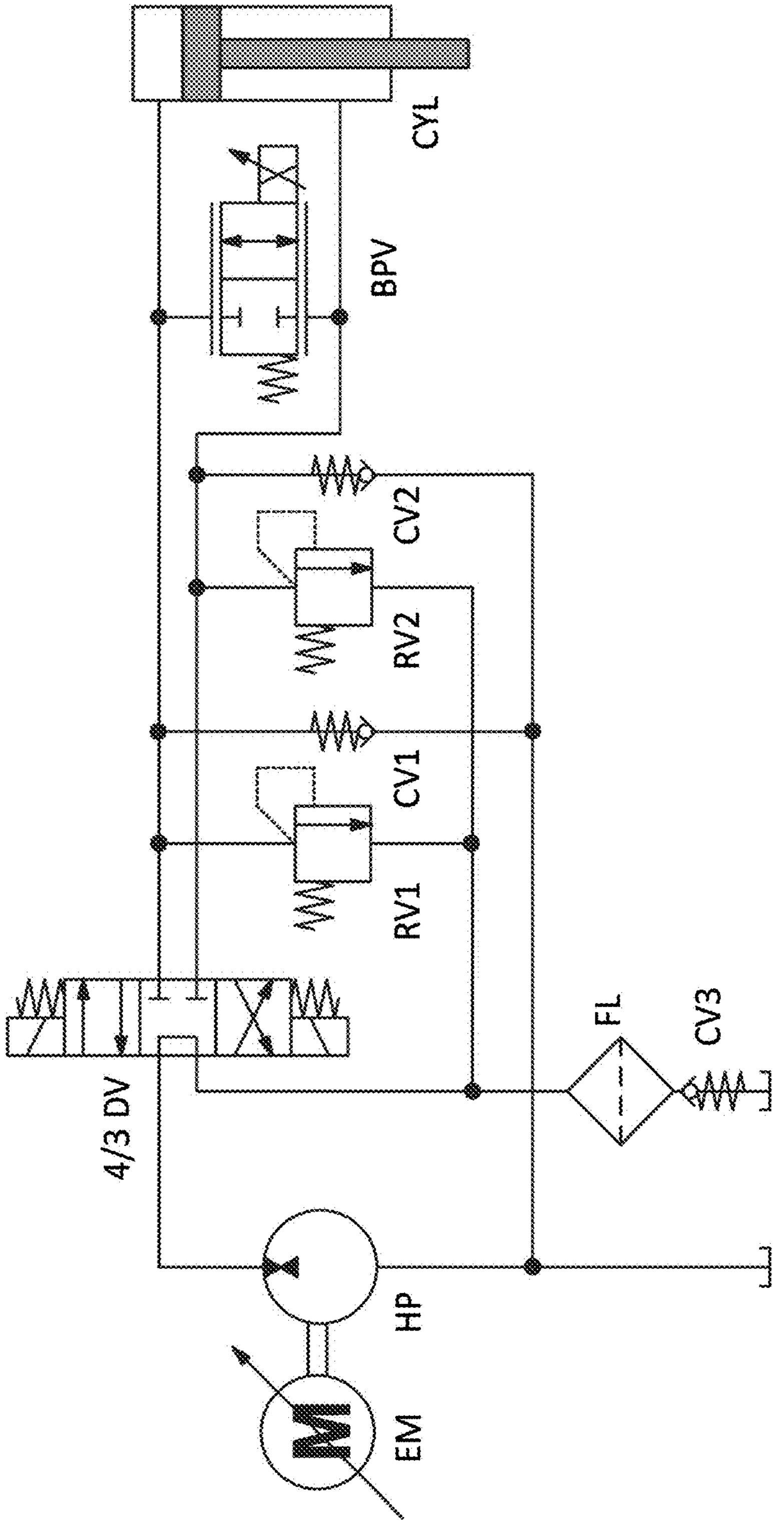
FIG. 1 schematically represents an electro-hydraulic actuator system with an open-circuit architecture in accordance with certain nonlimiting aspects of the invention.

FIG. 1 schematically represents a nonlimiting first EHA system that includes an open circuit architecture (also referred to herein as the open-circuit EHA system). The EHU of the EHA system includes a variable speed electric motor (labeled as VM in FIG. 1) and a fixed displacement hydraulic pump (labeled as HP in FIG. 1) that are operable to actuate an actuator, which in FIG. 1 is depicted as a piston and cylinder assembly (labeled as CYL in FIG. 1). As such, the actuator may be referred to simply as a "cylinder" in the following description. The cylinder has a piston connected to a piston rod that extends and retracts under the influence of hydraulic pressure delivered by the EHU (the pump and motor). The pump of FIG. 1 operates with high pressure on a first side thereof, which is connected to the cylinder, and is connected to a low pressure reservoir on a second side thereof. As such, the EHU is capable of operating in two quadrants in terms of pressure and speed and therefore operates in both pumping and motoring modes (i.e., extension and retraction modes). Although the pump operates in only two quadrants, the system includes a 4/3 directional valve (labeled as 4/3 DV in FIG. 1) that allows for four quadrant functionality of the cylinder. A 2/2 proportional valve functions as a bypass valve (labeled as BPV in FIG. 1) parallel to the cylinder. Two check valves (labeled as CV1 and CV2 in FIG. 1) are provided that address cavitation issues, which can occur in fast assistive retraction modes. Two pressure relief valves (labeled as RV1 and RV2 in FIG. 1) are installed on both sides of the pump in order to avoid over pressurization in either extension or retraction. A combination filter (labeled as FL in FIG. 1) and a third check valve (labeled as CV3 in FIG. 1) is provided for maintenance.

Figure 2:
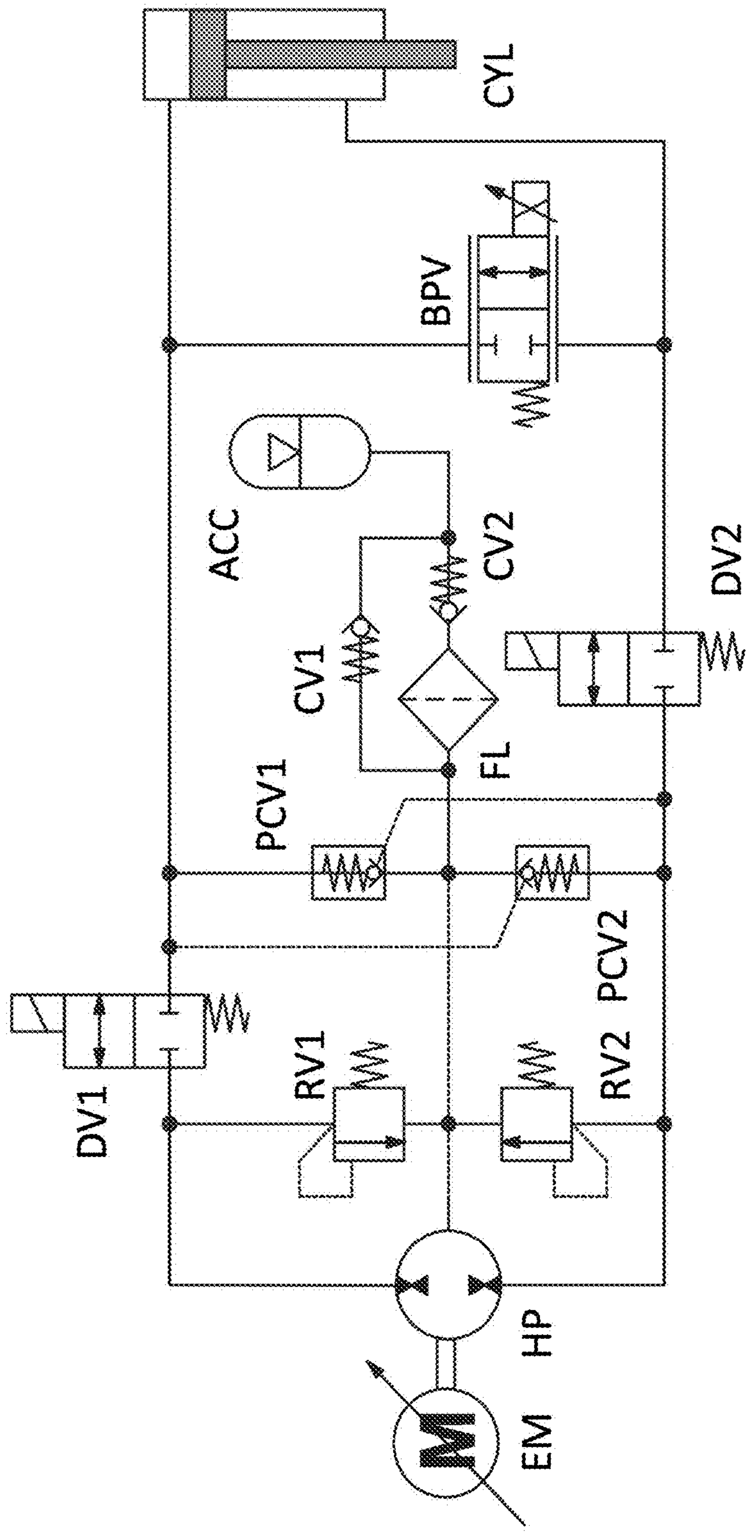
FIG. 2 schematically represents an electro-hydraulic actuator system with a closed-circuit architecture in accordance with certain nonlimiting aspects of the invention.

FIG. 2 schematically represents a nonlimiting second EHA system that includes a closed circuit architecture (also referred to herein as the closed-circuit EHA system). As in the open-circuit EHA system of FIG. 1, the EHU of the closed-circuit EHA system includes a variable speed electric motor (VM) and a fixed displacement hydraulic pump (HP) operable for actuating a cylinder (CYL). The pump operates with high pressure on both a first side and a second side thereof and is directly coupled to the cylinder on both the first and second sides. The pump includes a high-pressure pump port configured to switch during operation. Therefore, the pump can operate in four quadrants and, unlike the open-circuit EHA system of FIG. 1, a multi way directional valve is not necessary. Similar to the open-circuit EHA system of FIG. 1, the closed-circuit EHA system includes a 2/2 proportional valve that functions as a bypass valve (BPV) parallel to the cylinder. Differential flow required by a difference between bore and rod side cylinder ports of the cylinder is compensated by a low pressure accumulator (ACC), in both extension and retraction phases. Two pilot check valves (PCV1, PCV2) control the charging and discharging process of the cylinder. Two on/off directional valves (DV1, DV2) allow for a load holding capability. Two pressure relief valves (RV1, RV2) are installed on both sides of the pump in order to avoid over pressurization in either extension or retraction. A filter (FL) and two check valves (CV1, CV2) are included to protect against overloading and allow for proper fluid cleanliness. As a self contained system, the closed-circuit EHA system connects a drain of the pump to the cylinder, and thus limits the cylinder pressure to a maximum allowed drain line pressure.

Figure 3:
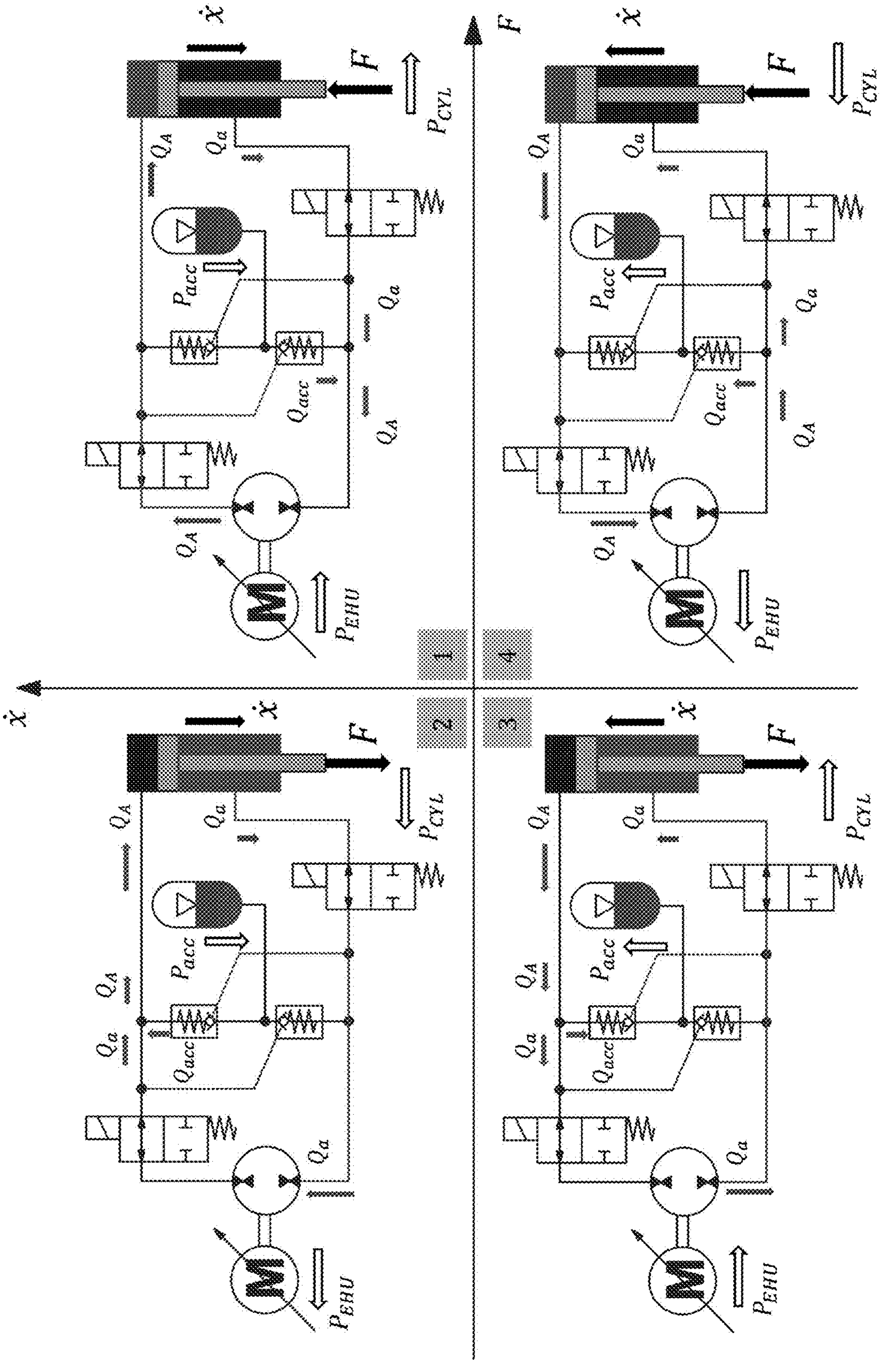
FIG. 3 represents a four-quadrant plot representative of working modes of an electro-hydraulic actuator system with a closed-circuit architecture in accordance with certain nonlimiting aspects of the invention.

FIG. 3 represents four working modes for the closed-circuit EHA system in terms of the applied load and actuation velocity. The working modes are labeled as 1 through 4 in the four quadrants illustrated in FIG. 3. The quadrants are delineated by an x-axis representing load force (F) on the cylinder and an y-axis representing actuation velocity ($\dot{x}$) of the cylinder. In the first and third quadrants, the closed-circuit EHA system operates in a resistive phase (i.e., the direction of speed is opposite to the force direction). In the second and fourth quadrants, the closed-circuit EHA system operates in an assistive phase in which energy regeneration occurs.

In the closed-circuit EHA system of FIG. 2, the accumulator compensates for the differential cylinder flow, as shown in equation (1).

$$Q_A = Q_a + Q_{acc} \tag{1}$$

$Q_A$, $Q_a$, $Q_{acc}$ denote the cylinder flow rate on the piston side, the cylinder flow rate on the rod side, and the accumulator flow, respectively. The accumulator discharges in extension phases (first and second quadrants) and charges in retraction phases (third and fourth quadrants).

Considering a cylinder area ratio A, flow rates are obtained per equations (2) and (3), where A and a denote the piston and rod areas, respectively. The accumulator compensates for differential flow from the cylinder.

$$Q_A = A\dot{x} = \lambda Q_a \tag{2}$$

$$Q_{acc} = (\lambda - 1)Q_a = (\lambda - 1)a\dot{x} \tag{3}$$

The efficiency of the hydraulic transmission system, q, is represented in equation (4).

$$\eta = \frac{P_{out}}{P_{in}} \tag{4}$$

However, input power ($P_{in}$) and output power ($P_{out}$) vary according to different working modes. In resistive phases, the EHU power ($P_{EHU}$) is equal to the input power, and the output power is equal to the cylinder power ($P_{CYL}$). In contrast, in assistive phases the input power and the output power have opposite roles. The accumulator power is added to the input power while discharging and to the output power when charging. Based on this definition, equations (5)-(8) represent the efficiencies identified for each one of the four-quadrant modes of operation.

$$\eta_1 = \frac{P_{CYL}}{P_{EHU} + P_{acc}} \tag{5}$$

$$\eta_2 = \frac{P_{EHU}}{P_{CYL} + P_{acc}} \tag{6}$$

$$\eta_3 = \frac{P_{CYL} + P_{acc}}{P_{EHU}} \tag{7}$$

$$\eta_4 = \frac{P_{EHU} + P_{acc}}{P_{CYL}} \tag{8}$$

The cylinder power is given by equation (9), which is the input power in assistive phases and the output power in resistive phases. Equation (10) represents accumulator power.

$$P_{CYL} = F \cdot \dot{x} \tag{9}$$

$$P_{acc} = Q_{acc} \cdot P_{acc} \tag{10}$$

As presented in equation (10), the accumulator power is usually limited by the drain pressure ($p_{drain}$) ($p_{acc} < p_{drain}$).

The efficiency of the EHU ($\eta_{EHU}$) under an isothermal assumption can be defined as the product of the pump efficiency ($\eta_{HP}$) and that of the electric motor ($\eta_{EM}$) which are functions of the shaft speed (n), the torque (T), and the pump pressure difference (Δp). Equations (11) and (12) represent the efficiency and power of the EHU.

$$\eta_{EHU} = \eta_{EM}(n, T) \cdot \eta_{HP}(n, \Delta p) \tag{11}$$

-continued $$P_{EHU,motor} = \frac{T \cdot n}{\eta_{EM}},\ P_{EHU,gene} = T \cdot n \cdot \eta_{EM} \tag{12}$$

To determine the performance of the closed-circuit EHA system, the power at the shaft connecting the pump and the electric motor may be defined as represented in equation (13).

$$P_{shaft} = T \cdot n \tag{13}$$

The overall energy efficiency of the pump can be broken down into its volumetric efficiency and its hydro-mechanical efficiency, which are given by the following definitions:

$$\eta_{vol,pump} = \frac{Q_p}{n \cdot V_p},\ \eta_{vol,motor} = \frac{n \cdot V_p}{Q_p} \tag{14}$$

$$\eta_{hm,pump} = \frac{\Delta p \cdot V_p}{T},\ \eta_{hm,motor} = \frac{T}{\Delta p \cdot V_p} \tag{15}$$

By replacing $P_{EHU}$ with $P_{shaft}$ from equations (5) to (8), it is possible to determine the efficiency of the overall closed-circuit EHA system.

The four-quadrant operation principle of the open-circuit EHA system is quite similar. A primary difference is that a reservoir is provided instead of the accumulator. However, the reservoir pressure is low and $P_{acc}$ is about equal to zero. As such, the definition of the efficiencies is the same.

Figure 4:
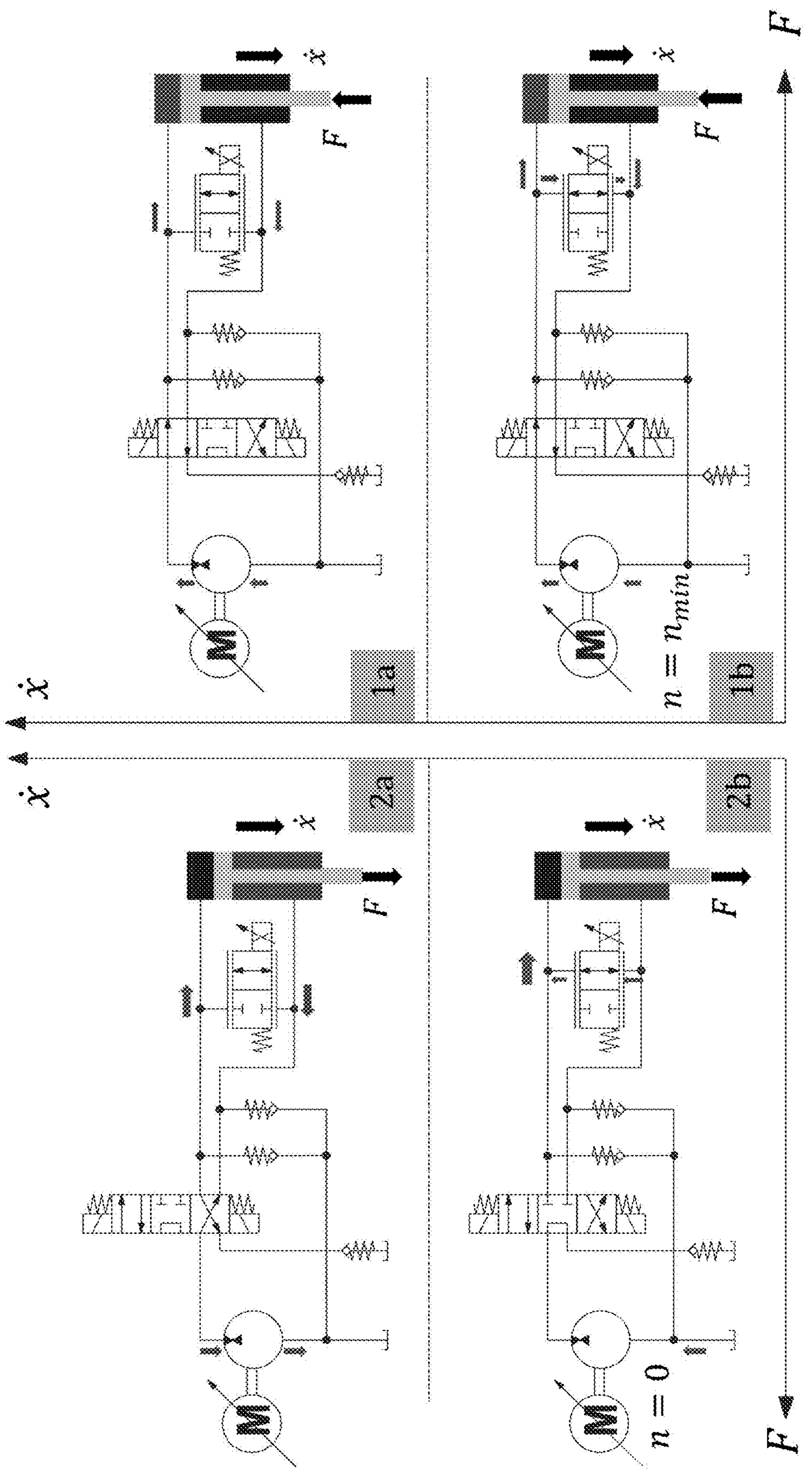
FIG. 4 schematically represents various working modes of the electro-hydraulic actuator system of FIG. 1 in extension phases (first and second quadrants).
Figure 5:
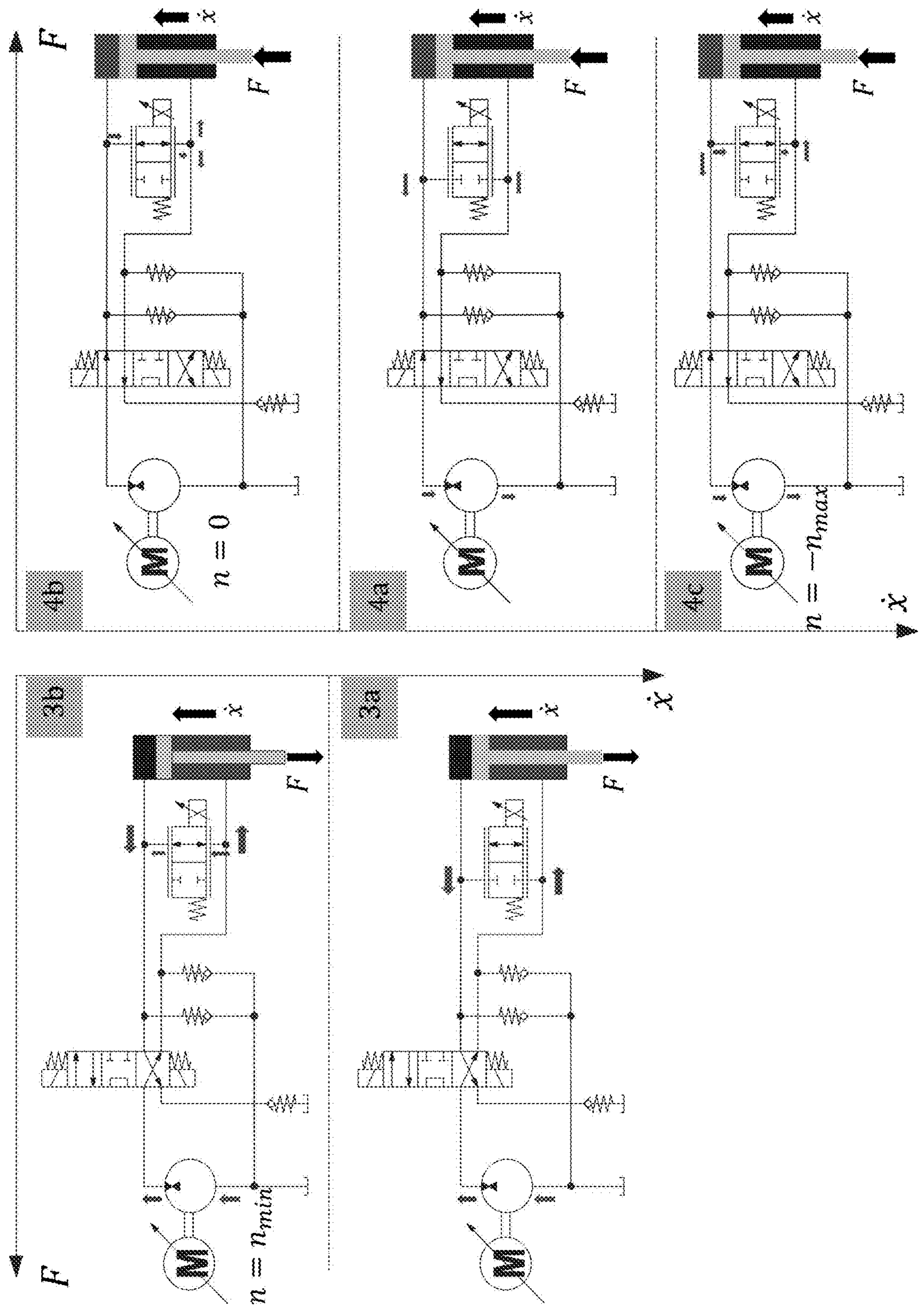
FIG. 5 schematically represents various working modes of the electro-hydraulic actuator system of FIG. 1 in retraction phases (third and fourth quadrants).

As previously stated, the EHA system can operate the actuator at actuation speeds higher than what would otherwise by possible when the pump is operating at its maximum flow (pumping) capability (at maximum pump velocity) and at actuation speeds lower than what would otherwise by possible when the pump is operating at its minimum flow (pumping) capability (at the pump minimum velocity). This is possible with proper usage of the bypass valve. FIGS. 4 and 5 represent functionality of the bypass valve in each quadrant separately for the open-circuit EHA system. FIG. 4 represents extension modes labeled as 1*a*, 1*b*, 2*a*, and 2*b*, and FIG. 5 represents retraction modes labeled as 3*a*, 3*b*, 4*a*, 4*b*, and 4*c*. The closed-circuit EHA system operates similarly, and is not represented here for brevity.

In each quadrant, working modes are classified into main modes that are further classified into high-speed and low-speed actuation sub-modes. The main modes are denoted by the letter "a" (e.g., 1*a*, 2*a*, 3*a*, and 4*a*). In these main modes, the bypass value remains closed and the working modes are the same as described in reference to the closed-circuit EHA system in FIG. 3.

Low-speed actuation sub-modes are denoted with the letter "b" (i.e., 1*b*, 2*b*, 3, and 4*b*). The sub-modes 1*b* and 3*b* are active in the resistive phases. The pump is set to the minimum speed, and the bypass valve is open to allow the desired flow to pass parallel to the cylinder and back to the reservoir, thus controlling the flow into the cylinder. In contrast, the sub-modes 2*b* and 4*b* are assistive phases. In these sub-modes, the pump speed is set to zero. Therefore, the opening of the bypass valve determines the actuation velocity. In these sub-modes, the EHU is unable to achieve energy recuperation.

High-speed actuation sub-modes are denoted with the letter "c" (i.e., 4*c*). The sub-mode 4*c* is active for high-speed actuation. In this sub-mode, the opening of the bypass value allows operation with higher speeds than the pump would allow if it had to compensate the full cylinder flow alone. Therefore, the sub-mode 4*c* and the main mode 3*a* can both reach the same maximum velocity. All sub-modes denoted with the letters "b" and "c" include metering control.

Though the full speed range can be achieved by opening the bypass valve, such operating conditions may introduce extra throttling losses as well. Equation (16) represents the power losses when the bypass valve is open.

$$P_{loss} = Q \cdot \Delta p = Q_{BPV} \cdot (p_A - p_a) \tag{16}$$

The throttling losses resulting from other hydraulic valves, pipes and connections of hoses can also be demonstrated by equation (16). Though not as significant as those from the bypass valve, all throttling losses can be considered.

During operation of the EHA system, a controller may enter into the different working modes based on two signals: a speed command (l) and a pressure difference at the cylinder (dp), which are described in equations (18) and (19). The sign of i is defined as positive in extension phases and negative in retraction phases. A positive dp indicates that the pressure in the piston-side chamber of the cylinder is higher, while a negative dp indicates that the pressure in the rod-side chamber of the cylinder is higher.

$$Q_{HP} = n \cdot V_D \tag{17}$$

$$i = \frac{\dot{x}_{des}}{\dot{x}_{max}} \tag{18}$$

$$dp = -p_A - p_a \tag{19}$$

The maximum actuation velocity $\dot{x}_{max}$ is defined in resistive phases, as given in equation (20) respectively for extension and retraction. The volumetric efficiency is assumed as 100% for the simple expression. Due to the differential cylinder, extension and retraction have different maximum velocities, as given in equation (21).

$$\dot{x}_{max,ex} = \frac{Q_{max}}{A} = \frac{n_{max} \cdot V_D}{A},\ \dot{x}_{max,re} = \frac{Q_{max}}{a} = \frac{n\,\mathrm{max} \cdot V_D}{a} \tag{20}$$

$$\dot{x}_{max,re} = \lambda \cdot \dot{x}_{max,ex} \tag{21}$$

The velocity $\dot{x}$ can be converted to the flow rate Q according to equations (2) and (3). Taking the working modes described in FIG. 3 into account, the desired flow rate $Q_{des}$ and pump speed $n_{des}$ to achieve $\dot{x}_{des}$ in four quadrants can be obtained as represented in equations (22) through (25). The flow rate of the hydraulic pump and the cylinder on the high-pressure lines are always equal to each other, as shown in FIG. 3 and described in equations (20) and (21). The first and third quadrants explained in equations (22) and (24), which are subscripted by one and three, correspond to the extension modes in equation (20). Instead, the second and fourth quadrants subscripted by two and four in equations (23) and (25), represent the retraction phases in equation (20). As a result, the impact of the area ratio on the speed regulation is evident.

$$Q_{des,1} = n_{des,1} \cdot V_D = \dot{x}_{des,1} \cdot A = i \cdot \dot{x}_{max,ex} \cdot A = i \cdot n_{max} \cdot V_D, \quad n_{des,1} = i \cdot n_{max} \tag{22}$$

$$Q_{des,2} = n_{des,2} \cdot V_D = \dot{x}_{des,2} \cdot a = i \cdot \dot{x}_{max,ex} \cdot a = i \cdot n_{max} \cdot \frac{V_D}{\lambda}, \quad n_{des,2} = i \cdot n_{max} / \lambda \tag{23}$$

$$Q_{des,3} = n_{des,3} \cdot V_D = \dot{x}_{des,3} \cdot a = i \cdot \dot{x}_{max,re} \cdot a = i \cdot n_{max} \cdot V_D, \quad n_{des,3} = i \cdot n_{max} / \lambda \tag{24}$$

$$Q_{des,4} = n_{des,4} \cdot V_D = \dot{x}_{des,4} \cdot A = i \cdot \dot{x}_{max,re} \cdot A = i \cdot n_{max} \cdot V_D \cdot \lambda, \quad n_{des,4} = i \cdot n_{max} \cdot \lambda \tag{25}$$

When $n_{des}$ is out of the operating speed range of the pump (i.e., between the minimum operating speed, of the pump and the maximum operating speed, $n_{max}$, of the pump), the bypass valve will be actively opened. As an example, sub-mode 1*a* in FIG. 4 can be regulated by $n_{min}<n_{(des,1)}<n_{max}$. According to equation (22), it can be expressed with i as represented in equation (26). Meanwhile, i>0 and dp>0 for the resistive extension mode.

$$\frac{n_{min}}{n_{max}} < i < 1 \tag{26}$$

Ultimately, the regulation of all modes in FIGS. 4 and 5 are given in Table III (FIG. 20) following equations (22) through (25). As λ=A/a>1, the sub-mode 4*c* enables an actuation velocity higher than the maximum pump flow rate allows. Considering the volumetric efficiency of the pump $\eta_{vol}$, $Q_{des}$ and $Q_{max}$ are multiplied by a number ($\eta_{vol}$ in pump modes, $1/\eta_{vol}$ in motor modes) in the regulation and the range of regulated l stays the same. In fact, $\eta_{vol}$ may vary in different working conditions, so that the threshold of l to get into low-speed modes can vary slightly for an ideal control. This case only has an impact when the EHA system gets very close to the low-speed modes and does not change the overall performance.

Figure 17:
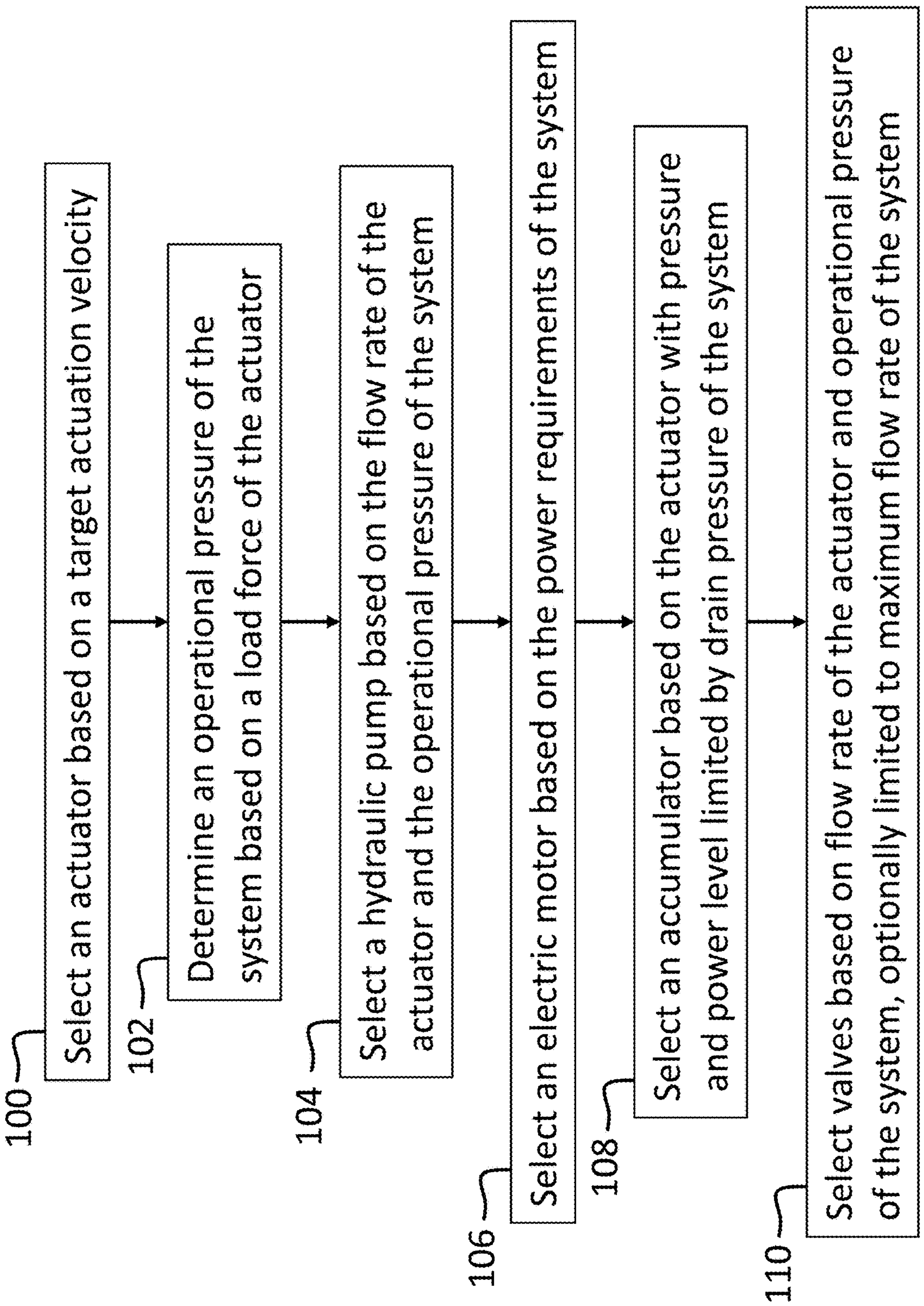
FIG. 17 schematically represents a flow chart for a method of sizing and selecting components for an electro-hydraulic actuator system.

FIG. 17 represents steps of a nonlimiting method for sizing the open-circuit and closed-circuit EHA systems. In step 100, an actuator may be selected to accommodate a target maximum actuation velocity of the desired EHA system. Alternatively, actuator may be selected based on a target most frequent velocity in a given duty cycle rather than the maximum actuation velocity. This sizing method provides for design of EHA systems with certain objectives, such as maximizing efficiency of the rotating speed and pump displacement of the EHU. All subsequent components may be selected based on the actuator chosen.

In step 102, the target maximum actuation velocity ($\dot{x}$) for a cylindrical actuator may be input into equation (2) to calculate a required actuator flow rate. The loading requirement of the actuator also provides the maximum operating pressure of the EHA system. Based on the flow rate and the operating pressure, a hydraulic pump may be selected in step 104. To avoid oversizing, the hydraulic pump may be chosen based on $Q_A$ in the first quadrant of FIG. 3. Based on equation (17), different options may be available for hydraulic pumps with the required flow rate in terms of maximum rotating speed and displacement. A two-quadrant hydraulic pump may be used for the open-circuit EHA system and a four-quadrant hydraulic pump may be used for the closed-circuit EHA system. The hydraulic pumps may have different displacements resulting in slightly different velocities for the two configurations. In step 106, the electric motor may be selected based on the power requirements of the hydraulic pump chosen. However, the electric motor may be chosen to have a different speed range with high efficiency from the hydraulic pump.

Based on equation (3), the accumulator compensates for the differential flow from the cylinder of the actuator. Therefore, the accumulator may be selected to have a volume greater than or equal to a volume of the cylinder rod as represented in step 108. In addition, according to equation (10), the working pressure of the accumulator should be no more than the drain pressure, thus limiting the size of accumulator. More importantly, the power level of the accumulator is limited due to the low pressure of $p_{drain}$, which is usually no more than 10 bar for the hydraulic pump.

In step 110, the remaining hydraulic components may be selected based on the flow rate and operating pressure. Generally, the larger the components (e.g., the valves), the less the resulting pressure drop during operation. However, in addition to promoting efficiency, the EHA systems may optionally be configured for promoting compactness. In such examples, the remaining hydraulic components may be sized such that their rated flow matches the maximum flow rates encountered in the EHA systems. This choice results in non-negligible throttling losses in actuation with high velocity, but not due to the regulation of the EHA systems.

Nonlimiting embodiments of the invention will now be described in reference to experimental investigations leading up to the invention.

Two test systems, one open-circuit EHA system and one closed-circuit EHA system, were fabricated using the sizing method of FIG. 17 and configured as represented in FIGS. 1 and 2, respectively. Specifically, the test systems were configured based on a target maximum actuation velocity) of approximately 0.2 m/s corresponding to a required actuator flow rate of 45 L/min and certain specific parameters given in Table I (FIG. 18). Therefore, a maximum target flow of the hydraulic pump was selected to also be about 45 L/min. It should be noted that while the open-circuit EHA system was operating in the sub-mode 4*c* (FIG. 5), the flow rate would be required to be about 75 L/min to reach the maximum retracting velocity due to the differential area of the cylinder. However, since this situation only occurred in one sub-mode, to avoid oversizing of the hydraulic pump, the target flow was set at 45 L/min and the bypass valve was used in sub-mode 4*c* to achieve the required actuation (i.e., 45 to 75 L/min).

The loading requirement of the actuator selected provided for an operation pressure of about 130 bar which enabled a load force of about 50 kN on the cylinder. Due to these conditions, the relief valve was set at 200 bar to avoid over-pressurization. Considering cost and practicality along with this operating pressure requirement (i.e., 130 bar), hydraulic pumps were selected having a displacement of about 15 cc/rec and a maximum rotating speed of around 3000 rpm. The chosen electric motors provided the EHA systems with a power of up to 20 kW.

The sizing parameters used for sizing the test systems are provided in Table I (FIG. 18). Main parameters of the hydraulic components selected for the test systems are provided in Table II (FIG. 19).

Figure 6:
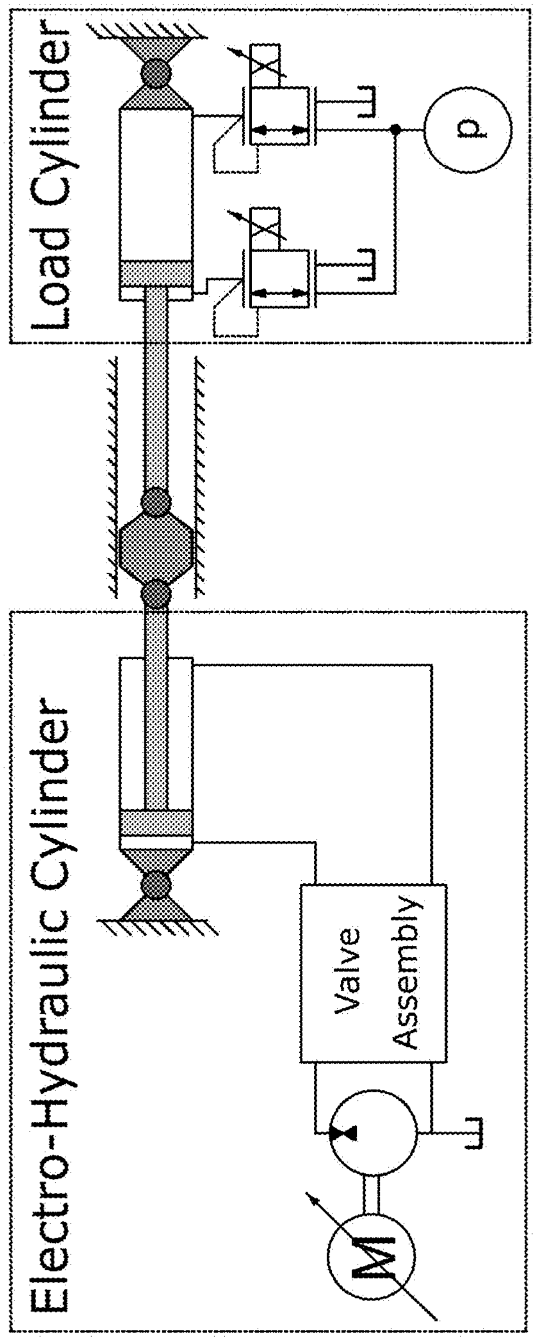
FIG. 6 schematically represents a test system for experimentally testing efficiency of the electro-hydraulic actuator systems of FIGS. 1 and 2.

As schematically represented in FIG. 6, the test systems comprised two modules that included the EHA system under test and a load module. The load module used an equal cylinder as the EHA module. It had a hydraulic circuit that could pressurize the cylinder chamber so that both resistive and assistive load conditions on the EHA system could be established. The loading force was controlled by two proportional reducing-relieving valves. Dual-axis joints coupled two cylinders and linear ball rails compensated for any side forces that occurred due to misalignment. Certain specific components selected for the test systems are provided in Table IV (FIG. 21).

In addition to the physical test systems, a lumped parameter simulation model was prepared that reproduced the EHA systems represented in FIGS. 1 and 2 along with the parameters and components disclosed in Tables I, II, and IV (FIGS. 18, 19, and 21, respectively). Table V (FIG. 22) outlines the models for the main hydraulic components, including the theoretical modeling equations used to describe the EHA system under the isothermal assumption. For the hydraulic pump of the EHU (i.e., HP in Table V), the basic steady-state modeling equation described the relation between flow rate and speed, and between pressure differential and torque. These equations included the energy efficiency parameters according to definitions of the above equations (11)-(15). For the linear actuator (i.e., the cylinder), the equations demonstrated the force balance and basic pressure build-up in cylinder chambers. For the accumulator, the modeling equation described the polytropic progress of the gas, which gave the relation between pressure and volume. To fulfill the flow rate requirements of the cylinder and the accumulator given in equations (1)-(3), the effective volume of the accumulator should be greater than that of the cylinder rod. Finally, for the valves, a basic orifice equation was used to state the relation between flow rate the pressure differential. The open fraction of the check valve (CV) was assumed as a linear function on the proportion of the pressure differential.

For the equations indicated with bold letters, the model required lookup tables of data obtained from datasheets of the components used for the test system. The efficiency map of the pump was generated by basic measurements. Characteristic curves of components were included in the simulation model, including but not limited to the volumetric efficiency map of the hydraulic pump and the performance graphs of the bypass valve. The speed range of the external gear machine $n_{min}$, $n_{max}$ from the datasheet confirmed the necessity of all sub-modes discussed previously.

Tests for extension and retraction were conducted with the test systems with an intention of covering a wide range of actuator velocities and load conditions, including low-speed actuation and velocities higher than the maximum pump flow. The load force varied from −30 kN to 50 kN in 10 kN steps. However, the tests did not include loads from 0 kN to 1 kN, as the EHA system under test could not properly detect the working modes (assistive or resistive) under such conditions.

Figure 7:
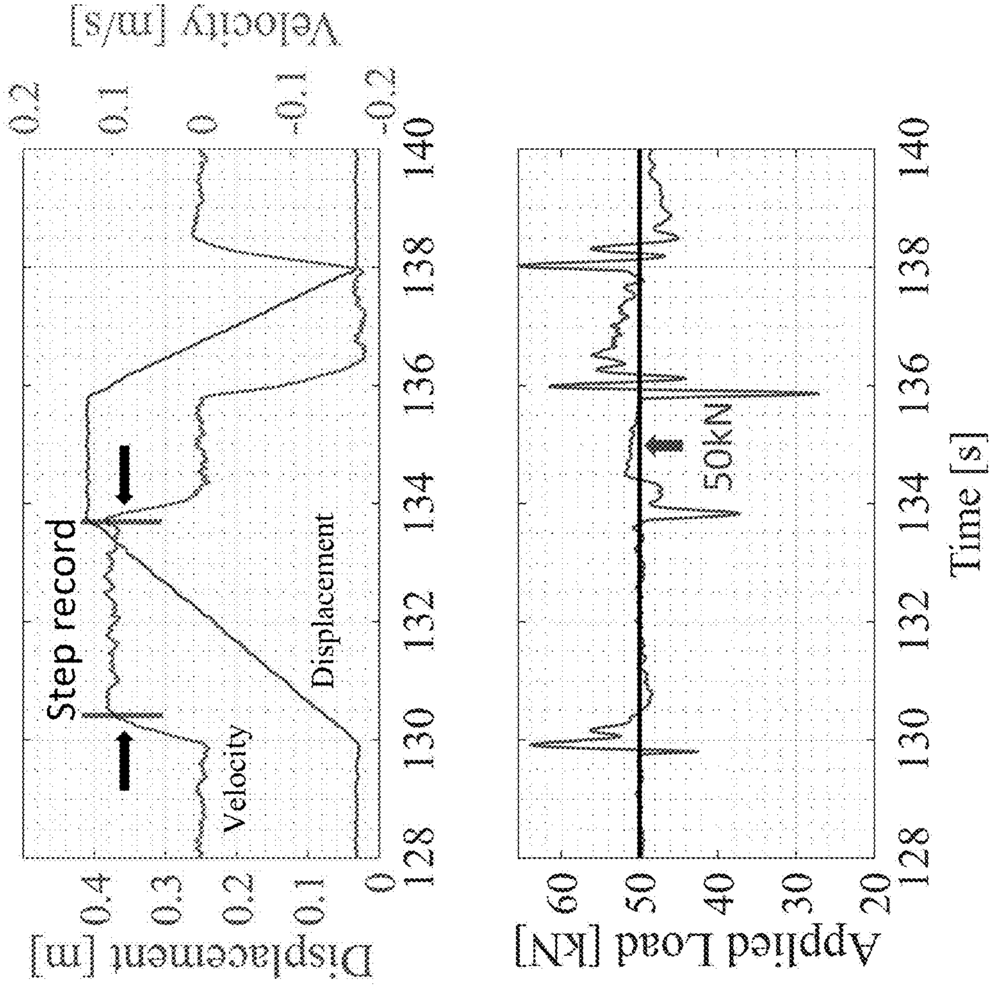
FIG. 7 includes graphs representative of displacement, velocity, and applied load measurements obtained with the test system of FIG. 6 while operating in steady-state extension (50% maximum velocity with 50 kN load).

FIG. 7 represents exemplary measurements for a certain data point: resistive extension at 50% maximum velocity with a 50 kN load. In the measurements, the load was held constant and a step speed command was given. As shown in the upper plot, a steady state was reached in the extension step. The recorded data was averaged in the step range to calculate power and efficiency. After each measurement, the actuator was controlled to return to the original position. By changing the applied load and speed command, the measurements covered all cases needed to generate an efficiency map. Although the load was supposed to be constant, the lower plot represents that the actual force varied slightly due to disturbances that could not be compensated the force controller of the load drive. When the desired load was small (e.g., 0 kN to 1 kN), this slight deviation interfered with the detection of the working mode and resulted in significant errors.

Figure 8:
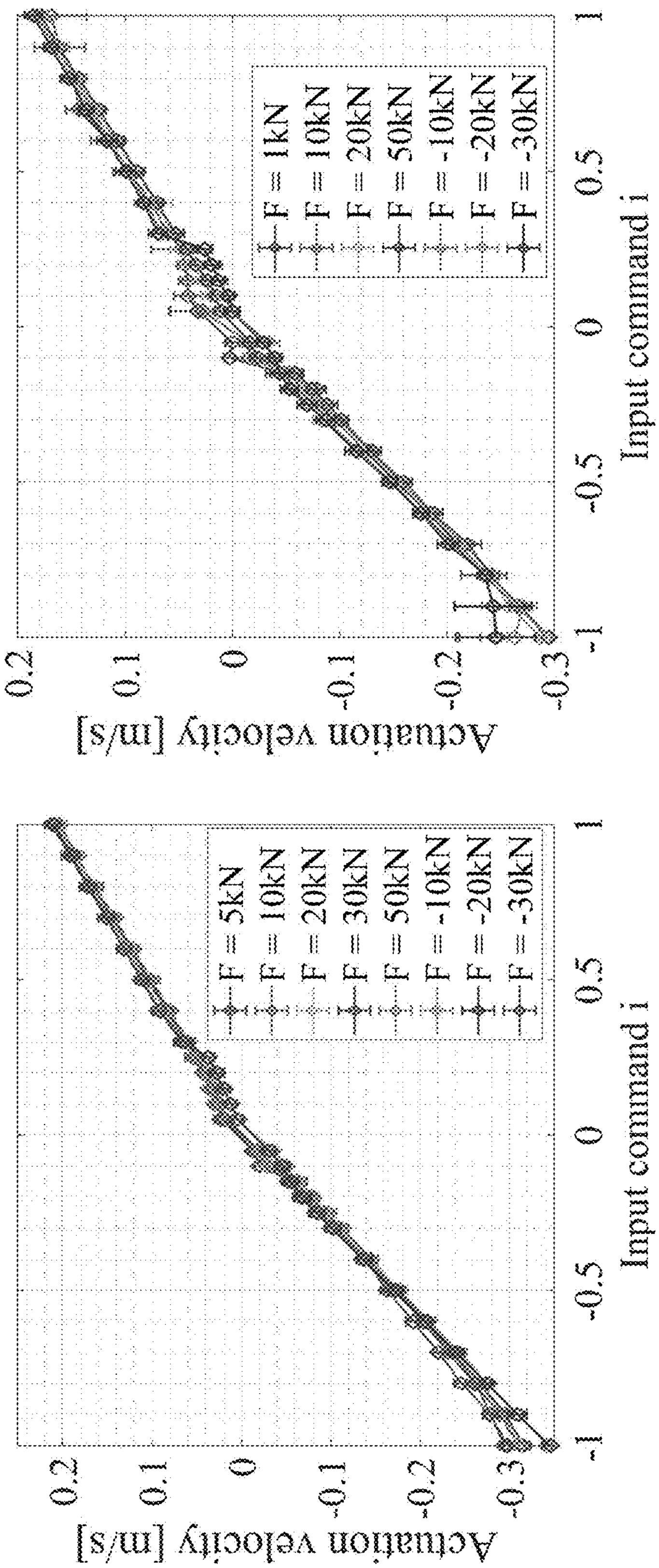
FIG. 8 includes graphs representative of speed control performance of the test system of FIG. 6 while operating with different loading conditions with the electro-hydraulic actuator systems of FIGS. 1 (left graph) and 2 (right graph).

FIG. 8 represents the speed control performance of the test systems. Regarding the actuation velocity and load applied to the cylinder, the map shows the system efficiency in different operating conditions. The velocity of actuation was defined as positive when the cylinder extended, as given in the first and second quadrants in FIG. 3. Negative velocity referred to a retraction. As for the applied load, positive load resulted in a higher pressure in the piston-side chamber, as represented in first and fourth quadrants in FIG. 3, while the negative force was covered by the second and third quadrants.

The linearity between the input speed command and the actuation velocity confirmed the functionality of the test systems. The low-speed modes showed some nonlinearity as a result of the characteristics of the bypass valve. Taking the pressure influence on the valve behavior into account, which was feasible as the pressures were measured, the performance could be improved. This was not done before because the pressure only has a significant influence on the valve behavior for very low-pressure drops, which are uncommon for many applications. In the right plot of FIG. 8 representing the closed-circuit EHA system, nonlinearity also appeared in high-velocity retraction modes. This may be attributed to slight cavitation from high pressure drops over the DVs during high flow rates. Regarding the linearity, the open-circuit EHA system performed better that the closed-circuit EHA system.

Figure 9:
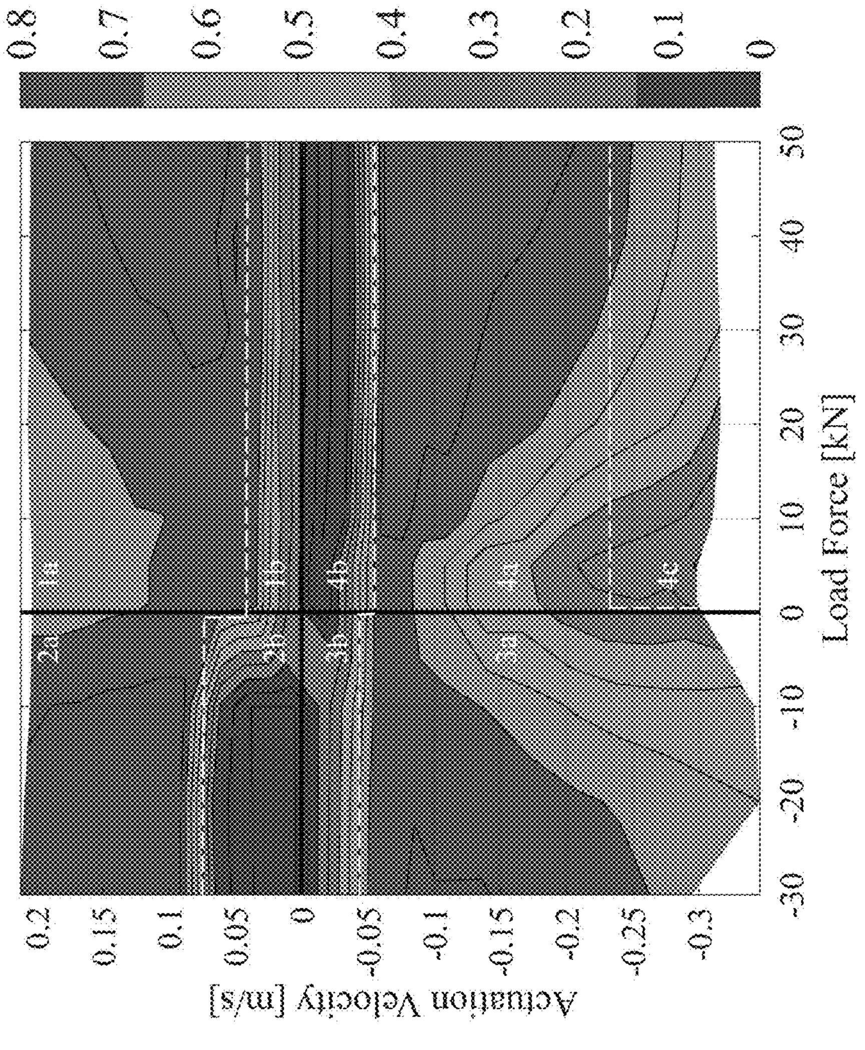
FIG. 9 includes an efficiency map of the electro-hydraulic actuator system of FIG. 1 based on measurements obtained with the test system of FIG. 6.

FIG. 9 represents an efficiency map of the open-circuit EHA system generated from steady-state test data. The power flow in the tests started at the hydraulic pump and ended in the cylinder, so the efficiencies were defined by equations (5)-(8) replacing $P_{EHU}$ with $P_{shaft}$. The thick black reference zero lines divide the map into four quadrants corresponding to the quadrants of FIG. 3. The white dashed lines and characters denote all of the sub-modes explained in reference to FIGS. 4 and 5. The efficiencies were observed to reach more than 70% in the main modes as shown in FIGS. 4 and 5, and up to 84.7% at very high loads.

In terms of the low-efficiency areas, two areas are especially noteworthy. One is the area covering low-speed (slow) actuation modes (i.e., sub-modes 1*b*, 2*b*, 3*b*, 4*b* in FIG. 9). In this scenario, the pump was set to minimum speed (resistive phases 1*b* and 3*b*) with low-efficiency or zero speed (assistive phases 2*b* and 4*b*). In assistive phases (2*b* and 4*b*) no energy could be recuperated, resulting in zero efficiencies. For low-speed resistive actuation, a portion of the pump power was converted to heat by the bypass valve, causing a reduced efficiency, but still not zero. As a result, the resistive phase area was less red than the assistive phase area. However, these cases only happened within a limited actuation velocity range (under about 0.06 m/s), and this low-speed resulted in low power consumption.

The other noteworthy low-efficiency area corresponds to the high-speed (fast) actuation mode. The reason for the low efficiency in the assistive phase (sub-mode 4*c*) was that the opening of the bypass valve introduced throttling losses. Besides, when the load was small, low efficiency appeared in high velocities resistive retraction. The reason was that the 4/3 directional valve shown in FIG. 1 introduced throttling losses that were only dependent on the flow rate which is up to 75 L/min. When the overall power level was low, these throttling losses had more significance and resulted in lower efficiency.

Figure 10:
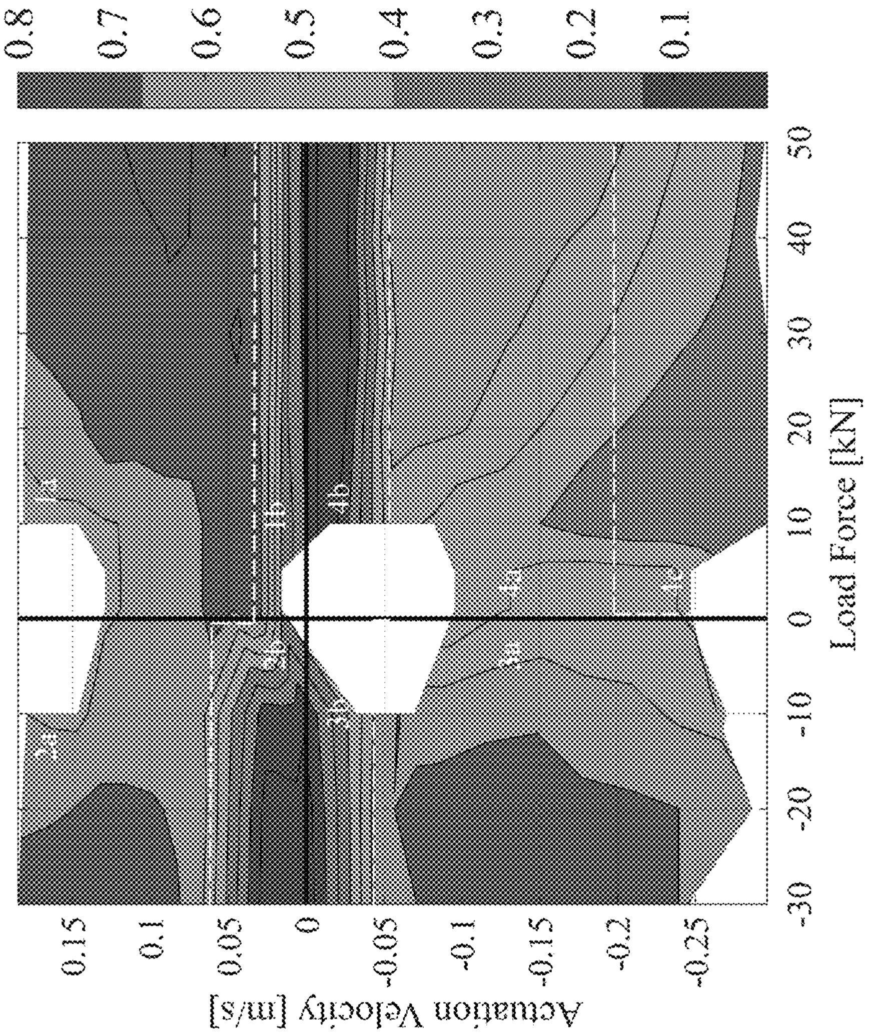
FIG. 10 includes an efficiency map of the electro-hydraulic actuator system of FIG. 2 based on measurements obtained with the test system of FIG. 6.

For comparison, FIG. 10 shows the efficiency map of the closed-circuit EHA system based on measurement data. Some small-load cases (below 5 kN) were excluded, as the closed-circuit EHA system tended to oscillate due to the difficulty in controlling the bypass valve with a rather small pressure differential. Moreover, for low forces, the power levels were quite low, and the resulting efficiencies from the power ratios were more sensitive to measurement errors, thus showing unrealistic values.

Good efficiencies were observed for the areas in which the bypass valve was closed. For example, a highest observed efficiency was 81.80% and most regions reached at least 60%. However, compared to the open-circuit EHA system, the overall efficiency was lower due to poor performance of the pump which was expected, being that the chosen pump was designed for more demanding conditions (e.g., bidirectional rotation and high pressure occurring at both ports) concerning the standard monodirectional gear pump used in the open-circuit EHA system. Therefore, the four-quadrant pump did not perform as well as the two-quadrant pump due to the constraints in the symmetric design.

In brief, comparing the results of the open-circuit EHA system in FIG. 9 and the closed-circuit EHA system in FIG. 10, the former performed more efficiently. The efficiency maps of FIGS. 9 and 10 may provide for implementation of the EHA systems of FIGS. 1 and 2 on different applications. For example, duty cycles of an excavator boom may occur in the first and the fourth quadrants in the efficiency maps. According to the working conditions of the application, an estimation can be made on efficiency performance in one duty cycle. The efficiency differed from 60% to 80% in most conditions based on the efficiency maps. As a comparison, the average efficiency of mobile hydraulic applications is currently about 21%. Therefore, a significant improvement could be reached with the EHA systems disclosed herein. Moreover, the efficiency maps indicate whether the EHA systems will perform with high efficiencies for certain applications or whether the EHA systems and/or other hydraulic components need to be resized to achieve better energy performance in a specific duty cycle.

The simulation model was used to provide a realistic estimation of the efficiency of the EHA systems in all of the working modes based on the parameters given in Table I (FIG. 18). All simulations were conducted considering steady-state conditions.

Figure 11:
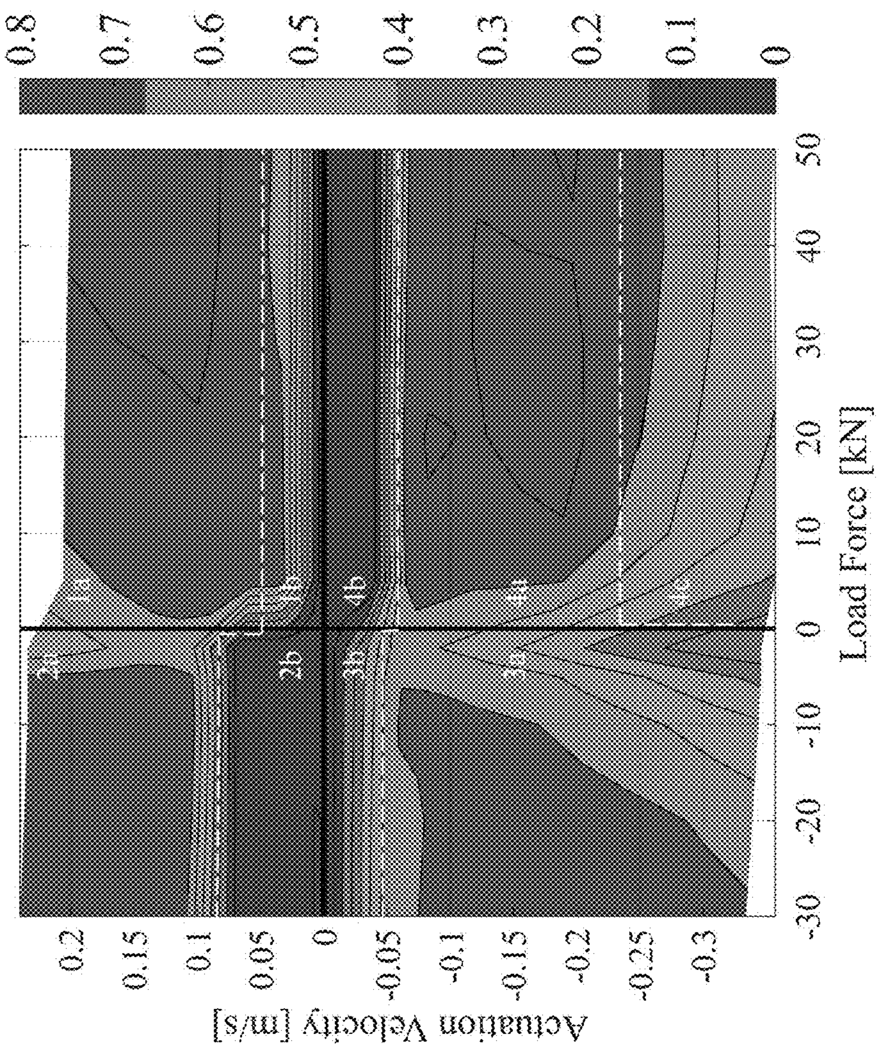
FIG. 11 includes an efficiency map of the electro-hydraulic actuator system of FIG. 1 based on measurements predicted with a simulation model.

FIG. 11 represents an efficiency map of the open-circuit EHA system based on results of the simulation. Similar to what was done in post-process for the experimental results, the power flow in the simulation started from the pump and ended at the cylinder. According to the results, the open-circuit EHA system showed high efficiencies of up to 83.8%. Low efficiencies existed in low-speed modes and high-speed modes when the bypass valve was actively opened, which was noticed in the experiments as well.

Figure 12:
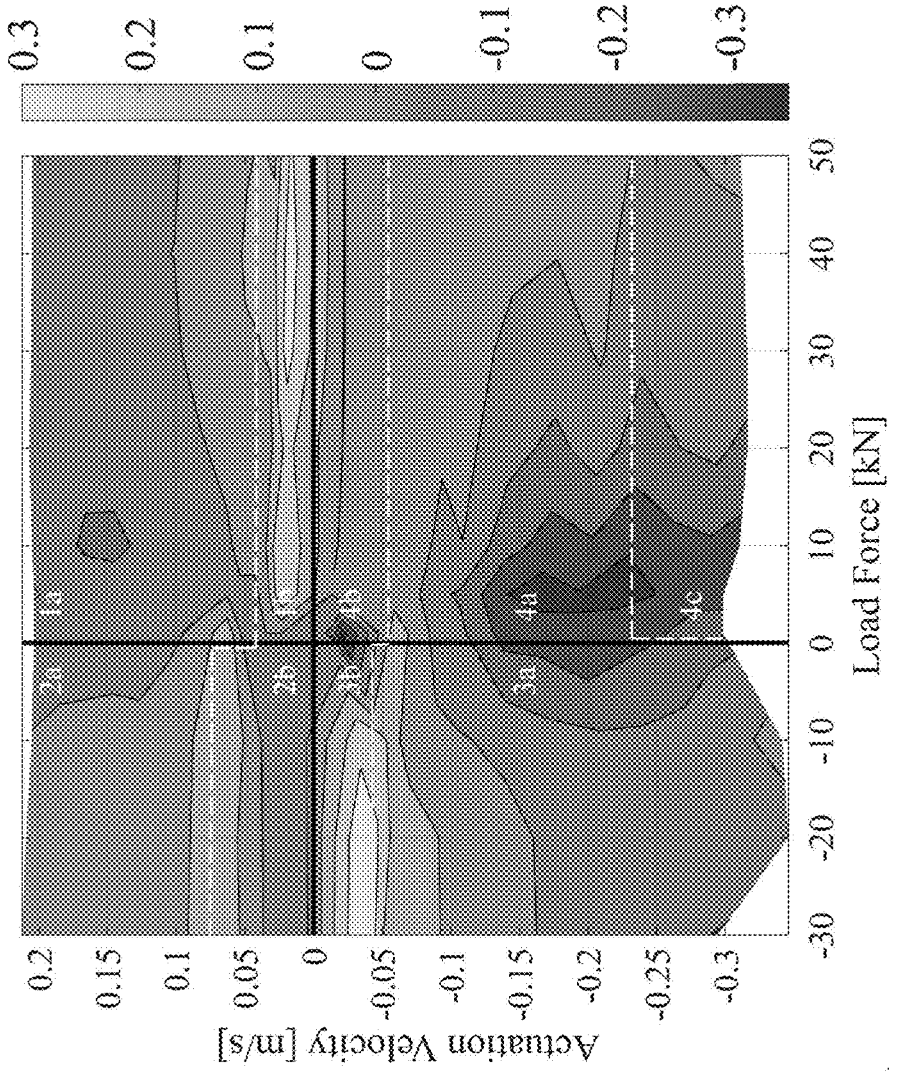
FIG. 12 includes a map representing relative discrepancies of efficiency between FIGS. 10 and 11.

FIG. 12 highlights the discrepancies between the experimental and simulation results by identifying differences between FIGS. 9 (experiments) and 11 (simulation). A negative number means the simulation model has higher efficiency, which occupies a large region in the map. This slight efficiency overprediction was expected because some losses, such as the line losses and linkage of fittings, were not included in the simulation model. In most regions of the map, discrepancies were between −0.1 to 0, meaning that the simulation and experiment results were in a very good agreement.

More relevant discrepancies occurred when the EHA systems operated in low-speed modes. The inaccuracy of the available efficiency data for the hydraulic pump under low-speed operation may have been a cause. In regards to the darkest area close to the zero-force line, the overall power was limited because of the small load. As a ratio of the input and output powers, the calculated efficiency could be sensitive and showed a large discrepancy at some points, which was up to ±0.3.

Figure 13:
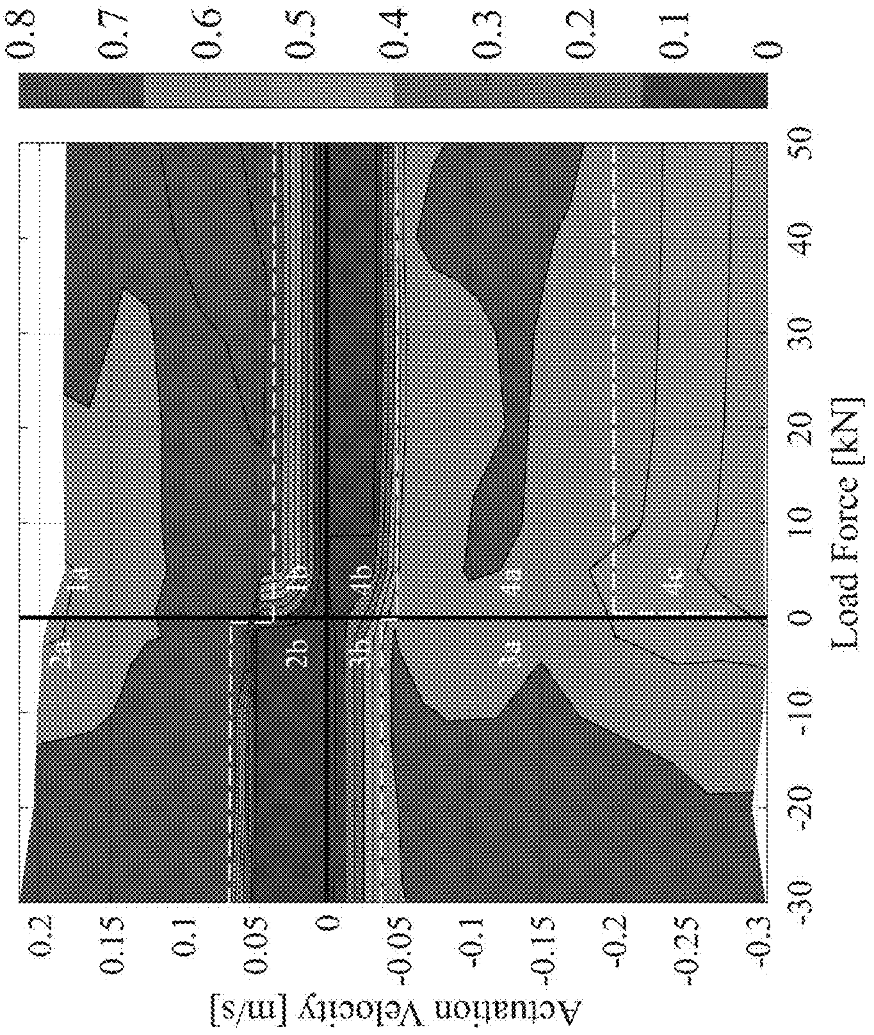
FIG. 13 includes an efficiency map of the electro-hydraulic actuator system of FIG. 2 based on measurements predicted with the simulation model.

Similarly, FIG. 13 represents an efficiency map of the closed-circuit EHA system from the simulation results. According to the simulation results, the best achievable efficiency was 82.0%. In terms of efficiency and compared to the open-circuit EHA system, the closed-circuit EHA system benefitted from the contribution of the accumulator as high-efficient energy storage. However, the lower energy efficiency of the hydraulic pump was more significant leading to an aggregate reduction in the overall efficiency of the closed-circuit EHA system. In summary, the overall energy efficiencies of the two EHA systems were similar, although the open-circuit EHA system performed better in the fourth quadrant (assistive retraction).

The low efficiencies appeared during low-speed actuation and high-speed assistive retraction modes because the bypass valve was opened and thus introduced additional throttling losses. Moreover, the displacement of the chosen four-quadrant pump was slightly smaller than the two-quadrant pump, resulting in a smaller speed range and less throttling losses, so that the efficiency under conditions with a small load and high velocity was better.

Figure 14:
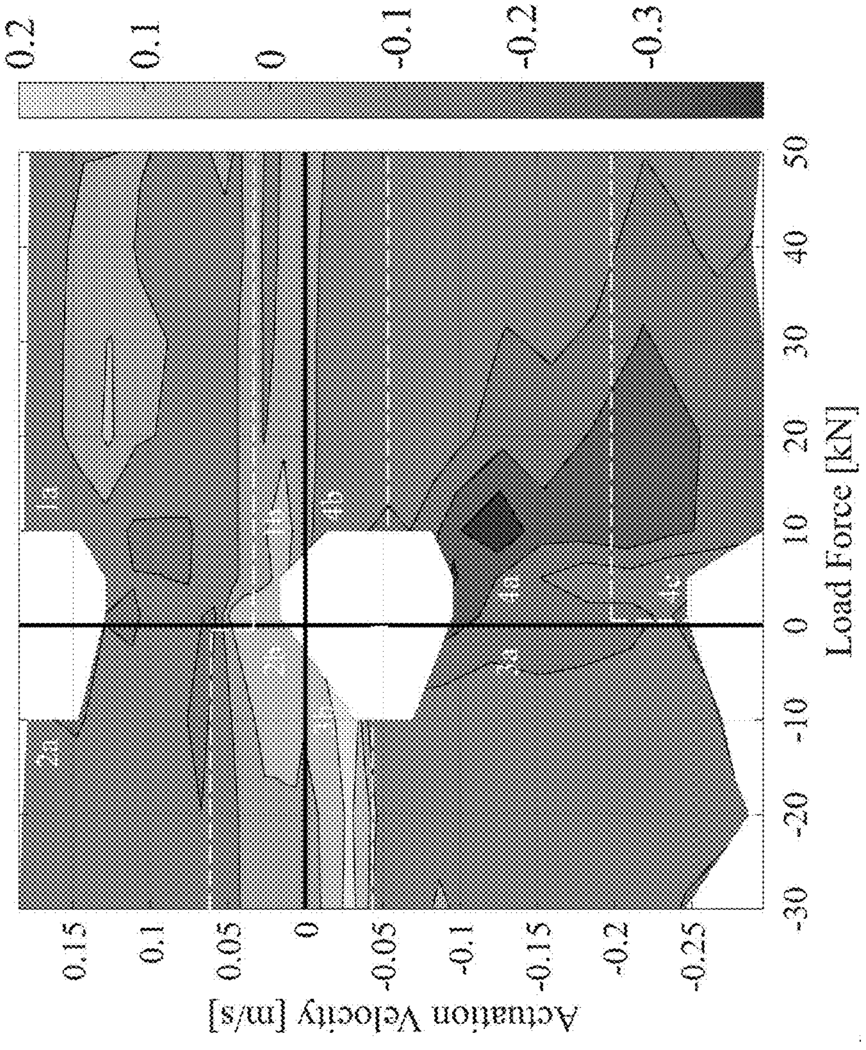
FIG. 14 includes a map representing relative discrepancies of efficiency between FIGS. 12 and 13.

FIG. 14 represents the discrepancies between FIGS. 10 (experiments) and 13 (simulations), which confirmed a good match for the efficiency trends in most regions of operation of the closed-circuit EHA system. Large discrepancies were noticed in the low-speed region (3*b*) and the fourth quadrant (4*a*). Again, this may be due to the low accuracy of the available data for the four-quadrant pump's efficiency. For the darkest area (inside 4*a*), another contributing factor may be the calculated efficiency was rather sensitive to the small values of power of the measurements in this area.

Other reasons for the discrepancies may have been that the losses in hydraulic pipes and valves were underestimated in the simulation of the closed-circuit EHA system. For example, the load force was assumed constant in simulation. However, in each measurement, the load force varied slightly. Insufficient dynamics of the force controller in the load drive caused these inaccuracies which may have impacted the discussed efficiency results. Finally, the simulation model was developed based on the isothermal assumption, which may have caused inaccuracies.

Overall, the good agreement between the simulation and the experiment efficiencies indicated how the simulation model was valid for at least a first estimate of the performance (e.g., system pressures and flows, system efficiencies parameters) of the EHA systems. Although the model had a tendency to slightly over predict the system efficiency, particularly when accurate characteristics from the components were not known, the model can still be very useful to study EHA systems of different sizes, such as equipped with different actuators or different hydraulic pumps. Therefore, the model can limit the recourse of expensive testing activities. Moreover, the model could be used for further considerations about the scalability of the EHA systems disclosed herein.

Figure 15:
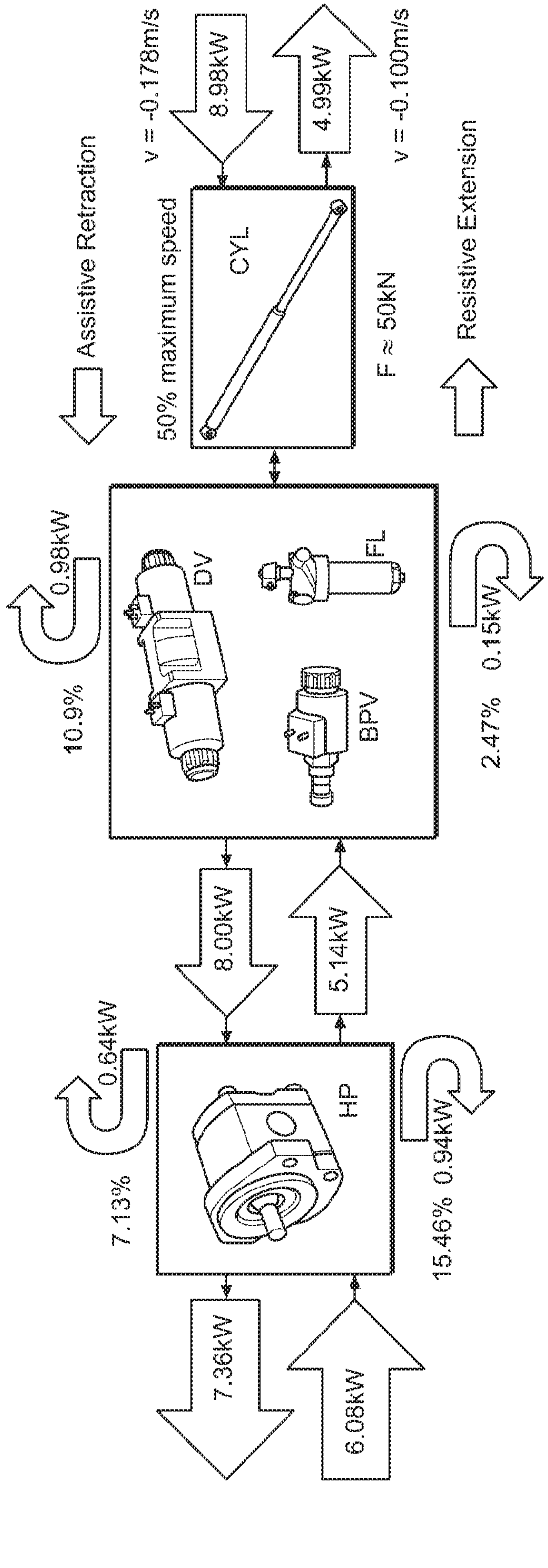
FIG. 15 schematically represents a power flow diagram of the electro-hydraulic actuator system of FIG. 1 (50% speed command, 50 kN load).

To further explain the performance of the EHA systems, FIG. 15 illustrates power flow of the open-circuit EHA system in a moderate power actuation (50% speed command, 50 kN load). The nonlimiting numerical values in the figure refer to exemplary experimental results. From the shaft connecting the electric motor with the pump to the cylinder, the diagram represents the input/output power of each component in the EHA system and the corresponding power losses. In the resistive extension mode, the pump wasted 15.46% of the input power while the throttling losses present in the system counted only for 2.47%. As for the assistive retraction, a higher speed was achieved due to the area ratio of the differential cylinder. More flow rate resulted in 10.9% power losses in the hydraulic circuit. A different sizing choice, such as larger valves, could be beneficial to reduce the fluid throttling. The two-quadrant pump showed high efficiency as a motor and could regenerate energy with a power of 7.36 kW.

Figure 16:
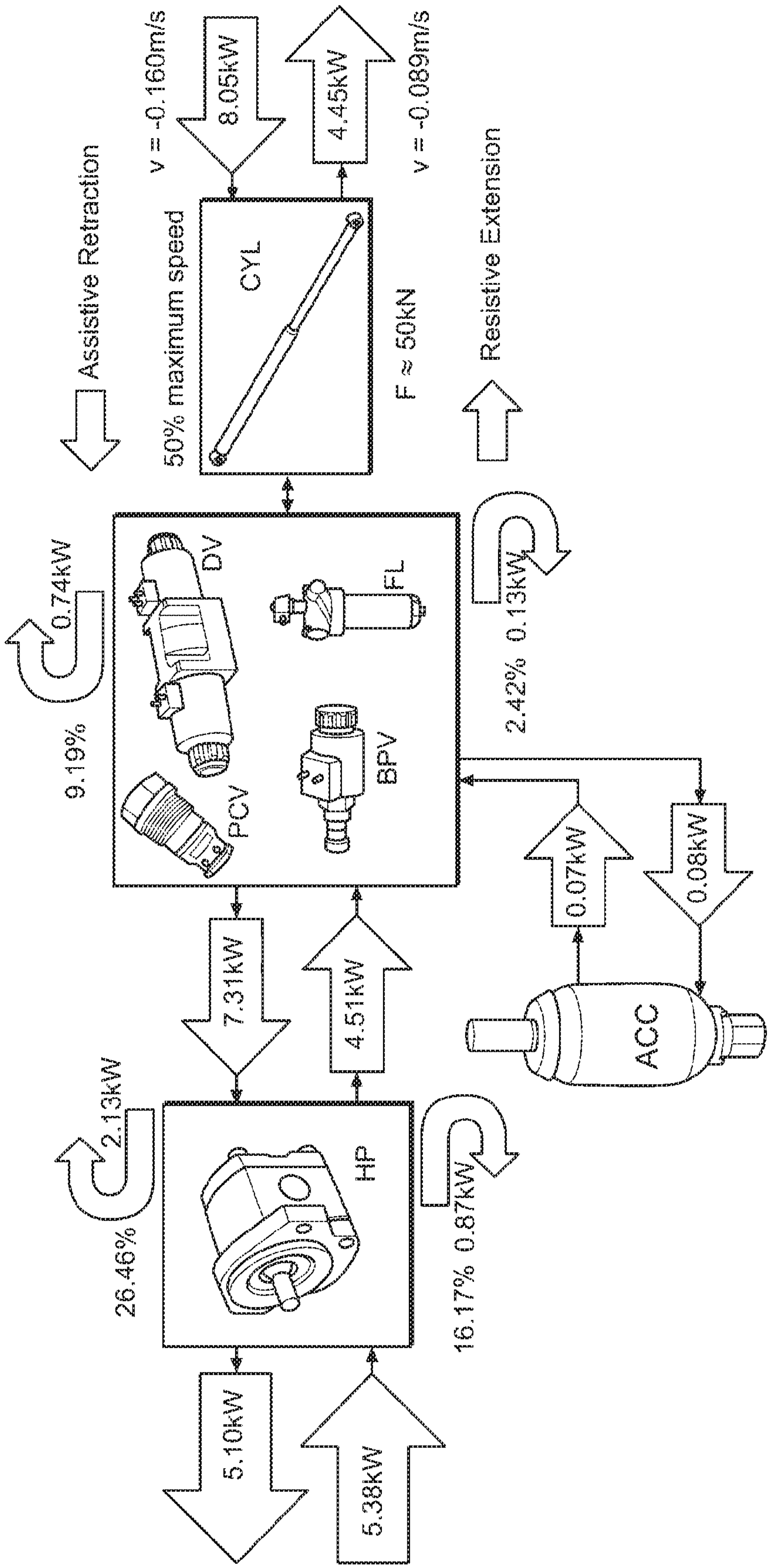
FIG. 16 schematically represents a power flow diagram of the electro-hydraulic actuator system of FIG. 2 (50% speed command, 50 kN load).

FIG. 16 represents power flow of the closed-circuit EHA system under the same working conditions as FIG. 15. Because the four-quadrant pump's displacement was smaller than the two-quadrant pump, the actuation velocity and the overall power level were lower. One of the main differences from the open-circuit EHA system was on the utilization of the accumulator, which could assist the system in the resistive extension mode and store energy during assistive retraction. However, the operating pressure of the accumulator was limited by the maximum pump drain line pressure ratings, which are commonly lower than 5 bar (some pumps accept up to 10 bar). Compared to the cylinder's working pressure, the accumulator pressure was too low to contribute much to energy saving. The power of the accumulator was less than 0.1 kW under these working conditions. Another difference was the performance of the pump. The four-quadrant pump resulted in 2.13 kW power losses in motor mode, corresponding to 26.46% of the cylinder's input power. The throttling losses were similar as in the open-circuit EHA system.

The power flow analysis confirmed that the open-circuit EHA system operated more efficiently and had a better energy-saving capability. The closed-circuit EHA system remained less efficient due to the low pressure at which the accumulator operated and the poor performance of the four-quadrant pump.

The experiments and the simulations were performed considering a reference 20 kW application consisting of a differential cylinder of 0.89 m stroke and 50 kN maximum force, commonly used in some off-road vehicles. The results indicated that the EHA systems can achieve efficiencies greater than 80% for both open-circuit and closed-circuit architectures. These EHA systems were able to operate efficiently by decreasing the throttling losses and enabling energy regeneration. However, the low-speed modes have low efficiencies due to the use of the bypass valve being open. Similarly, the high-speed modes use the bypass valve and therefore have high throttling losses, with the assumption that the pump operates at the same maximum speed under assistive or resistive phases.

Comparing the open-circuit EHA system and the closed-circuit EHA system, the open-circuit EHA system performed better in terms of energy efficiency. This was mainly because a standard two-quadrant pump typically has higher efficiencies than a gear unit designed for a four-quadrant operation. The accumulator used in the closed-circuit EHA system could not contribute much to the energy savings because of the limited operating pressure required by the EHA system in the accumulator line.

These experimental and simulated results indicated that the system represents a viable solution for applying EHA systems in cost-sensitive applications, such as off-road vehicles in construction and agriculture (e.g., excavators, wheel loaders, etc.). Specifically, the EHA systems were able to reach high energy efficiency and good potentials of energy recuperation during instances of assistive phase loads. As a nonlimiting example, the EHA systems could be used in fluid power machines such as off-road vehicles to potentially increase the energy efficiency level of the fluid power actuation system from a current industry average of about 21% to 80% or more as shown herein.

In addition, the simulation model was able to accurately determine the overall behavior of the EHA systems and identify operating conditions of maximum efficiency for all the working modes. As such, the simulation model represents a powerful tool for design considerations for EHA systems.

While the invention has been described in terms of specific embodiments, it is apparent that other forms could be adopted by one skilled in the art. For example, the physical configuration of the EHA systems could differ from those shown, and materials and processes/methods other than those noted could be used. Therefore, the scope of the invention is to be limited only by the following claims.

The invention claimed is:

1. A method for configuring an electro-hydraulic actuator system having a closed-circuit architecture, the electro-hydraulic actuator system comprising an actuator having extension and retraction modes of operation, a fixed-displacement hydraulic pump and a variable speed electric motor configured in combination to constitute an individual electro-hydraulic unit that is coupled to the actuator for actuation thereof between the extension and retraction modes, the fixed-displacement hydraulic pump having a maximum flow capability associated with a maximum operating speed ($n_{max}$) of the fixed-displacement hydraulic pump and having a minimum flow capability associated with a minimum operating speed ($n_{min}$) of the fixed-displacement hydraulic pump, and a bypass valve in parallel to the actuator; wherein the electro-hydraulic actuator system is operable to actuate the actuator at actuation speeds that are higher than a maximum actuation capability of the fixed-displacement hydraulic pump at the maximum flow capability thereof and at actuation speeds that are lower than a minimum actuation capability of the fixed-displacement hydraulic pump at the minimum flow capability thereof, the method comprising:

- determining a target maximum actuation velocity for the electro-hydraulic actuator system;
- selecting the actuator based on the target maximum actuation velocity;
- determining an operational pressure of the electro-hydraulic actuator system based on a load force requirement of the actuator;
- selecting a fixed-displacement hydraulic pump based on the flow rate of the actuator and the operational pressure of the electro-hydraulic actuator system; and
- selecting a variable speed electric motor based on power requirements of the electro-hydraulic actuator system.

2. The method of claim 1, wherein the electro-hydraulic actuator system has an energy efficiency level equal to or greater than 80%.

3. The method of claim 1, wherein the actuator is a single-rod double-acting cylinder.

4. The method of claim 1, further comprising a low-pressure accumulator configured to compensate for differential flow between a bore side area and a rod side area of the actuator.

5. The method of claim 4, further comprising two pilot check valves that, in combination with the low-pressure accumulator, are configured to control charging or discharging of the actuator.

6. The method of claim 1, further comprising two directional on/off valves configured to enable load holding by the actuator.

7. The method of claim 1, further comprising pressure relief valves on both sides of the fixed-displacement hydraulic pump that are configured to avoid over-pressurizations in either extension or retraction of the actuator.

8. The method of claim 1, further comprising:

selecting an accumulator based on the actuator with pressure and power level limited by a drain pressure of the electro-hydraulic actuator system; and selecting valves based on flow rate of the actuator and operational pressure of the electro-hydraulic actuator system.

9. The method of claim 8, wherein selecting the valves includes limiting the flow rate to the maximum flow capability associated with the maximum operating speed ($n_{max}$) of the fixed-displacement hydraulic pump of the electro-hydraulic actuator system.

* * * * *